(12) United States Patent
Kitada et al.

(10) Patent No.: US 8,915,281 B2
(45) Date of Patent: Dec. 23, 2014

(54) SYSTEM FOR MANUFACTURING OPTICAL DISPLAY UNIT AND FEED MECHANISM

(75) Inventors: Kazuo Kitada, Ibaraki (JP); Takuya Nakazono, Ibaraki (JP); Satoru Koshio, Ibaraki (JP); Tomokazu Yura, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 377 days.

(21) Appl. No.: 12/747,390

(22) PCT Filed: Jan. 7, 2009

(86) PCT No.: PCT/JP2009/050075
§ 371 (c)(1),
(2), (4) Date: Jun. 10, 2010

(87) PCT Pub. No.: WO2009/088013
PCT Pub. Date: Jul. 16, 2009

(65) Prior Publication Data
US 2010/0258249 A1    Oct. 14, 2010

(30) Foreign Application Priority Data

Jan. 10, 2008  (JP) .................................. 2008-003418
Jan. 7, 2009   (JP) .................................. 2009-001340

(51) Int. Cl.
B32B 38/10   (2006.01)
B32B 37/16   (2006.01)
B29D 11/00   (2006.01)

(52) U.S. Cl.
CPC .................................. *B29D 11/0074* (2013.01)
USPC ........................... 156/538; 156/510; 156/556

(58) Field of Classification Search
CPC .............. B65H 37/007; B43L 19/0068; B32B 2457/202; B32B 38/18; B65C 9/1865; B29D 11/0074; B29D 2009/00
See application file for complete search history.

(56) References Cited

U.S. PATENT DOCUMENTS 3,690,015 A * 9/1972 Umahashi et al. ................. 34/95
3,779,439 A * 12/1973 Jessop ............................. 226/88

(Continued)

FOREIGN PATENT DOCUMENTS

CN    1496815 A    5/2004
CN    1498719 A    5/2004

(Continued)

OTHER PUBLICATIONS

International Search Report of PCT/JP2009/050075, mailing date of Apr. 21, 2009.

(Continued)

*Primary Examiner* — Philip Tucker
*Assistant Examiner* — Vicki Wu
(74) *Attorney, Agent, or Firm* — Westerman, Hattori, Daniels & Adrian, LLP

(57) ABSTRACT

Provided is a system for manufacturing an optical display unit and a feed mechanism, which can well prevent an optical film and a pressure-sensitive adhesive layer from being peeled from a release film. A pressure-sensitive adhesive type sheet material, wherein the optical film and the pressure-sensitive adhesive layer (film main body (F)) are cut without cutting a release film (F12, F22) which is laminated to the optical film with the pressure-sensitive adhesive layer in between, is fed along a feed path (12A, 22A). A press member (200) is arranged at a position opposed to a bent portion or a curved portion in the feed path (12A, 22A). Since the film main body (F) which is peeled from the release film (F12, F22) can be pressed to the release film (F12, F22) by the press member (200), the film main body (F) can be well prevented from being peeled from the release film (F12, F22).

18 Claims, 11 Drawing Sheets

(56) References Cited

U.S. PATENT DOCUMENTS

| | | | |
|---|---|---|---|
| 4,002,280 A * | 1/1977 | Coleman et al. | 226/171 |
| 4,181,421 A * | 1/1980 | Kitrosser | 396/620 |
| 2004/0095526 A1 | 5/2004 | Yamabuchi et al. | |
| 2004/0169809 A1 | 9/2004 | Yamabuchi et al. | |
| 2006/0185796 A1* | 8/2006 | Hayasaka et al. | 156/361 |
| 2007/0013858 A1 | 1/2007 | Yamabuchi et al. | |
| 2007/0252293 A1 | 11/2007 | Sato et al. | |
| 2009/0159175 A1 | 6/2009 | Nakahira et al. | |
| 2009/0186170 A1 | 7/2009 | Yamamoto et al. | |

FOREIGN PATENT DOCUMENTS

| | | |
|---|---|---|
| DE | 3152881 A1 | 7/1983 |
| JP | 2004-167673 A | 6/2004 |
| JP | 2005-343643 A | 12/2005 |
| JP | 2007-140046 A | 6/2007 |
| TW | 554201 B | 9/2003 |
| TW | 200808530 A | 2/2008 |

OTHER PUBLICATIONS

Taiwanese Office Action dated Jul. 2, 2010, issued in corresponding Taiwanese Patent Application No. 098100732.

Notification of Transmittal of Translation of the International Preliminary Report on Patentbility (Form PCT/IB/338) of International Application No. PCT/JP2009/050075 mailed Aug. 19, 2010 with Forms PCT/IB/373 and PCT/ISA/237.

Chinese Office Action dated Nov. 13, 2012, issued in corresponding Chinese Patent Application No. 200980101456A, with English translation.

Supplementary European Search Report dated Nov. 28, 2011, issued in corresponding European Patent Application No. 09701126.6.

Chinese Office Action dated Jun. 28, 2012, issued in corresponding Chinese Patent Application No. 200980101456.4, with English translation (8 pages).

Office Action dated May 14, 2014, issued in corresponding Chinese Patent Application No. 201210322616.1, with English Translation (20 pages).

* cited by examiner

SYSTEM FOR MANUFACTURING OPTICAL DISPLAY UNIT AND FEED MECHANISM

TECHNICAL FIELD

The present invention relates to a system for manufacturing an optical display unit in which an optical film is adhered to a display substrate with a pressure-sensitive adhesive layer interposed therebetween, and a feed mechanism.

BACKGROUND ART

A production method of an optical display device mounted to a conventional liquid crystal display device is conceptually shown in FIG. 11. First, in an optical film maker, a step produces a long (web-like) sheet material having an optical film as a material roll (#1). The concrete production step is a known production step, and a description thereof will not be given. As the "long (web-like) sheet material", for example, there are a polarizing plate material, a retardation plate material, a laminated film material of the polarizing plate and the retardation plate, and the like which are used in a liquid crystal display device. Next, the material roll is slit to a predetermined size (a size in accordance with a size of the display substrate) (#2). Next, the slit long material is cut to a fixed size in conformity to a size of the display substrate (#3). Next, a step inspects an outer appearance of a piece of sheet material (an optical film) cut to the fixed size (#4). As the inspecting method, for example, there can be listed up a defect inspection in accordance with a visual observation, and an inspection using a known defect inspection apparatus. The defect means, for example, a dirty in a front face or an internal portion, a scratch, a special twisted defect like a hitting mark generated by biting a contaminant (which may be called as a knick), an air bubble, a contaminant or the like. Next, a step inspects a finished product (#5). The finished product inspection is an inspection in accordance with a quality standard having a severer non-defective determination than the outer appearance inspection. Next, a step works end faces in four sides of the sheet material of the piece of sheet material (#6). This step is carried out for preventing an adhesive or the like from running over from the end faces during transport. Next, a step cleanly packages the piece of sheet material under a clean room environment (#7). Next, a step packages for transport (a transport package) (#8). The piece of sheet material is produced as mentioned above, and is transported to a panel processing manufacturer.

In the panel processing manufacturer, a step dismounts the package of the piece of sheet material transported (#11). Next, a step inspects an outer appearance for inspecting the scratch, the dirt and the like generated at a time of transporting or dismounting the package (#12). The piece of sheet material which is determined as the non-defective by the inspection is fed to the next step. There is a case that the outer appearance inspection is omitted. A display substrate (for example, a glass substrate unit in which a liquid crystal cell is enclosed) to which the piece of sheet material is bonded is previously produced, and the display substrate is cleaned before the bonding step (#13).

A step bonds the piece of sheet material and the display substrate (#14). A release film is peeled off from the piece of sheet material while leaving a pressure-sensitive adhesive layer, and it is bonded to one face of the display substrate by using the pressure-sensitive adhesive layer as a bonding face. Further, it can be bonded to the other face of the display substrate in the same manner. In the case of bonding to both the faces, the structure may be made such that the optical films having the same construction are bonded to the faces of the display substrate, or the structure may be made such that the optical films having different constructions are bonded thereto. Next, a step carries out an inspection of the display substrate in the state in which the optical film is bonded and a defect inspection (#15). The optical display unit which is determined as the non-defective in this inspection is fed to a mounting process (#16). On the other hand, a reworking process is applied to the optical display unit which is determined as a defective (#17). In the reworking process, the optical film is peeled off from the display substrate. The optical film is newly bonded to the reworked display substrate (#14).

In the production step mentioned above, since the optical film maker and the panel processing manufacturer exist in the separate places, the end face working, the packaging of the piece of sheet material, the package dismounting and the like are particularly necessary steps. However, there are a problem of a production cost increase caused by multiple steps, a problem of the scratch, the dust, the dirt and the like generated by the multiple steps and the transport, a necessity of the inspection step caused thereby, and a problem that it is necessary to store and manage many kinds of sheet materials as a stock.

As a method of solving the problems, there has been proposed Japanese Patent Application Laid-Open (JP-A) No. 2007-140046. In accordance with this invention, the structure is provided with a supply portion pulling out and supplying a long sheet material from a material roll around which the long sheet material having an optical film corresponding to a member of an optical display device is wound, a detection portion detecting a defect of the long sheet material pulled out by the supply portion, a cutting work portion cutting the long sheet material based on a result of detection of the detection portion and working to an individual sheet material, a feed portion feeding the sheet material cut by the cutting work portion for a bonding work, and a bonding work portion bonding the sheet material fed by the feed portion and a display substrate corresponding to a member of an optical display device, and these portion are arranged on a continuous production line. In the structure mentioned above, it is possible to directly cut the long sheet material having the optical film into a desired size, and to bond the cut sheet material to the display substrate. Accordingly, it is possible to directly package the long sheet material wound around the material roll so as to deliver, in place of the conventional step which stamps the long sheet material, tightly packages the stamped sheet material, and delivers to the panel processing manufacturer.

A pressure-sensitive adhesive layer for adhering the optical film to a display substrate is formed in the optical film, and a release film is laminated to the pressure-sensitive adhesive layer, whereby the long sheet material (the sheet material) is formed. The release film can be peeled from the optical film before or after detecting a defect by means of the detection portion.

Patent document 1: Japanese Unexamined Patent Publication No. 2007-140046

DISCLOSURE OF THE INVENTION

Problems to be Solved by the Invention

As a method of cutting the optical film, there is proposed a method of cutting the optical film and the pressure-sensitive adhesive layer without cutting the release film laminated to the optical film with the pressure-sensitive adhesive layer interposed therebetween, and peeling the release film from the optical film before a bonding process applied to the display substrate.

However, in the method mentioned above, in the case that the feed path along which the sheet material is fed has a portion changing a feed direction such as a bent portion or a curved portion, there is a risk that the optical film and the pressure-sensitive adhesive layer are peeled from the release film at a cut position, at a time of being fed in the bent portion or the curved portion. In the case that the optical film and the pressure-sensitive adhesive layer are peeled as mentioned above, there is a risk that a contaminant is attached to the pressure-sensitive adhesive layer, or the optical film is bonded to every portion in the feed path with the pressure-sensitive adhesive layer interposed therebetween.

The present invention is made by taking the actual condition mentioned above into consideration, and an object of the present invention is to provide a system for manufacturing an optical display unit and a feed mechanism, which can well prevent an optical film and a pressure-sensitive adhesive layer from being peeled from a release film.

Means for Solving the Problems

As a result of devoting themselves to make a study for solving the problem mentioned above, the inventors run into a completion of the present invention mentioned below.

A manufacturing system of an optical display unit according to a first aspect of the present invention relates to a manufacturing system of an optical display unit in which an optical film is adhered to a display substrate with a pressure-sensitive adhesive layer interposed therebetween, comprising:

a feeder for feeding a pressure-sensitive adhesive type optical film which is formed of the optical film and the pressure-sensitive adhesive layer and has a corresponding shape to the display substrate to be bonded, in a state of being laminated in the pressure-sensitive adhesive layer to a long release film;

a peeling apparatus for peeling the pressure-sensitive adhesive type optical film to be fed from the release film; and an optical film bonding apparatus for bonding the pressure-sensitive adhesive type optical film peeled from the release film in the pressure-sensitive adhesive layer to the display substrate, wherein the feeder includes:

a feed direction changing apparatus positioned in an opposite side to the optical film with respect to the release film, and for changing a feed direction of the pressure-sensitive adhesive type optical film; and a peeling preventing apparatus which is opposed to the feed direction changing apparatus at a distance which is equal to or more than a total thickness of the pressure-sensitive adhesive type optical film and the release film, while interposing the pressure-sensitive adhesive type optical film and the release film therebetween, at a position at which the feed direction of the pressure-sensitive adhesive type optical film is changed, and prevents the pressure-sensitive adhesive type optical film from being peeled from the release film.

According to the present invention, the pressure-sensitive adhesive type optical film formed of the optical film and the pressure-sensitive adhesive layer, and having the corresponding shape to the display substrate to be bonded is fed in a state in which it is laminated in the pressure-sensitive adhesive layer to the long release film, and the release film is peeled from the pressure-sensitive adhesive type optical film just before the bonding process applied to the display substrate. In other words, since the structure can be made such that the pressure-sensitive adhesive layer corresponding to the bonded surface of the optical film is not exposed just before the bonding, it is possible to prevent the contaminant from being mixed to the bonded surface of the optical film.

Further, it is possible to feed the pressure-sensitive adhesive type optical film having the corresponding shape to the display substrate to be adhered, by using the release film as a carrier. Accordingly, since it is possible to provide the feeder for the pressure-sensitive adhesive type optical film with a simpler structure, it is possible to reduce a cost for manufacturing the optical display unit.

Particularly, since the peeling preventing apparatus is provided in such a manner as to be opposed to the feed direction changing apparatus at a distance which is equal to or more than a total thickness of the pressure-sensitive adhesive optical film and the release film, while interposing the pressure-sensitive adhesive type optical film and the release film therebetween, at a position at which the feed direction of the pressure-sensitive adhesive type optical film is changed, it is possible to well prevent the pressure-sensitive adhesive type optical film from being peeled from the release film.

The manufacturing system of an optical display unit according to a second aspect of the present invention relates to the manufacturing system of an optical display unit, wherein the feed direction changing apparatus configures a feed path length changing apparatus for changing a path length of a feed path along which the pressure-sensitive adhesive type optical film is fed.

According to the present invention, the peeling preventing apparatus can be provided in the feed path length changing apparatus changing the path length of the feed path. The pressure-sensitive adhesive type optical film tends to be peeled from the release film, at the position at which the path length of the feed path is changed, however, it is possible to well prevent the pressure-sensitive adhesive type optical film from being peeled, by providing the peeling preventing apparatus at the position.

The manufacturing system of an optical display unit according to a third aspect of the present invention relates to the manufacturing system of an optical display unit, wherein the feed direction changing apparatus changes the feed direction of the pressure-sensitive adhesive type optical film at 90 degrees or more.

According to the present invention, the peeling preventing apparatus can be provided at such a position having a large angle of change of the feed direction that the feed direction of the pressure-sensitive adhesive type optical film is changed at 90 degrees or more. The pressure-sensitive adhesive type optical film tends to be peeled from the release film at such a position that the feed direction of the pressure-sensitive adhesive type optical film is largely changed, however, it is possible to well prevent the pressure-sensitive adhesive type optical film from being peeled, by providing the peeling preventing apparatus at the position.

The manufacturing system of an optical display unit according to a fourth aspect of the present invention relates to the manufacturing system of an optical display unit, wherein the peeling preventing apparatus is formed into a shape which is along a feed locus of the pressure-sensitive adhesive type optical film.

According to the present invention, it is possible to effectively prevent the pressure-sensitive adhesive type optical film from being peeled, by the peeling preventing apparatus having the shape which is along the feed locus of the pressure-sensitive adhesive type optical film.

The manufacturing system of an optical display unit according to a fifth aspect of the present invention relates to the manufacturing system of an optical display unit, wherein a space formed between the peeling preventing apparatus and the feed direction changing apparatus is formed in such a manner as to become gradually smaller toward a downstream side from an upstream side in the feed direction of the pressure-sensitive adhesive type optical film.

According to the present invention, since the space formed between the peeling preventing apparatus and the feed direction changing apparatus is formed in such a manner as to become gradually smaller from the upstream side toward the downstream side in the feed direction of the pressure-sensitive adhesive type optical film, it is possible to well guide the leading end portion of the peeled pressure-sensitive adhesive type optical film into the space, even in the case that the pressure-sensitive adhesive type optical film has been already peeled from the release film before being fed into the space. Accordingly, it is possible to better prevent the pressure-sensitive adhesive type optical film from being peeled from the release film.

The manufacturing system of an optical display unit according to a sixth aspect of the present invention relates to the manufacturing system of an optical display unit, wherein the pressure-sensitive adhesive type optical film having a corresponding shape to the display substrate is obtained by cutting a sheet laminated material formed of the pressure-sensitive adhesive type optical film which is long and the release film which is long, in such a manner as to cut the long pressure-sensitive adhesive type optical film into a corresponding shape to the display substrate without cutting the release film.

According to the present invention, since the long pressure-sensitive adhesive type optical film is cut into the corresponding shape to the display substrate without the release film being cut in the sheet laminated material, it is possible to feed the cut pressure-sensitive adhesive type optical film by using the release film as the carrier. Accordingly, since it is possible to provide the feeder for the pressure-sensitive adhesive type optical film with a simpler structure, it is possible to reduce a cost for manufacturing the optical display unit.

The manufacturing system of an optical display unit according to a seventh aspect of the present invention relates to the manufacturing system of an optical display unit in which an optical film is adhered to a display substrate with a pressure-sensitive adhesive layer interposed therebetween, comprising:

a feeder for feeding a pressure-sensitive adhesive type sheet material in which a release film laminated to the optical film with the pressure-sensitive adhesive layer interposed. therebetween is not cut, but the optical film and the pressure-sensitive adhesive layer are cut, along a feed path having a bent portion or a curved portion;

a press member provided at a position opposed to the bent portion or the curved portion in the feed path, and provided for pressing the optical film peeled from the release film to the release film side;

a peeling apparatus for peeling the release film from the pressure-sensitive adhesive type sheet material fed along the feed path; and an optical film bonding apparatus for bonding the optical film from which the release film is peeled, to the display substrate with the pressure-sensitive adhesive layer interposed therebetween.

According to the present invention, the release film which is laminated to the optical film with the pressure-sensitive adhesive layer interposed therebetween is not cut, the pressure-sensitive adhesive type sheet material in which the optical film and the pressure-sensitive adhesive layer are cut is fed along the feed path, and the release film is peeled from the optical film just before the bonding process applied to the display substrate. In other words, since the structure can be made such that the pressure-sensitive adhesive layer serving as the bonded surface of the optical film is not exposed just before being bonded, it is possible to prevent the contaminant from being mixed to the bonded surface of the optical film.

Further, since the release film is not cut, but the optical film and the pressure-sensitive adhesive layer are cut, it is possible to feed the optical film and the pressure-sensitive adhesive layer which are cut, by using the release film as a carrier. Accordingly, since it is possible to provide the feeder for the optical film with a simpler structure, it is possible to reduce a cost for manufacturing the optical display unit.

Particularly, it is possible to press the optical film which is peeled from the release film to the release film side, by the press member which is provided at a position opposed to the bent portion or the curved portion in the feed path. Accordingly, it is possible to well prevent the optical film from being peeled from the release film.

The manufacturing system of an optical display unit according to a eighth aspect of the present invention relates to the manufacturing system of an optical display unit, further comprising a cutting apparatus for cutting the optical film and the pressure-sensitive adhesive layer of the pressure-sensitive adhesive type sheet material, without cutting the release film which is laminated to the optical film with the pressure-sensitive adhesive layer interposed therebetween, wherein the press member is provided between the cutting apparatus and the optical film bonding apparatus in the feed path.

According to the present invention, it is possible to cut the optical film and the pressure-sensitive adhesive layer without cutting the release film which is laminated to the optical film with the pressure-sensitive adhesive layer interposed therebetween, by the cutting apparatus, and well prevent the optical film after being cut from being peeled from the release film, by the press member.

The manufacturing system of an optical display unit according to a ninth aspect of the present invention relates to the manufacturing system of an optical display unit, further comprising a displacement mechanism displacing for changing a path length of the feed path, wherein the press member is provided in the displacement mechanism.

According to the present invention, the press member can be provided in the displacement mechanism which displaces for changing the path length of the feed path. The optical film tends to be peeled from the release film, at the position at which the path length of the feed path is changed, however, it is possible to better prevent the optical film from being peeled, by providing the press member at the position.

The manufacturing system of an optical display unit according to a tenth aspect of the present invention relates to the manufacturing system of an optical display unit, wherein a forward moving direction of the pressure-sensitive adhesive type sheet material fed along the feed path is changed at 90 degrees or more in the bent portion or the curved portion.

According to the present invention, the press member can be provided at the position which is opposed to such a bent portion or curved portion having the large angle that the forward moving direction of the pressure-sensitive adhesive type sheet material is changed at 90 degrees or more. The optical film tends to be peeled from the release film at the position at which the forward moving direction of the pressure-sensitive adhesive type sheet material is largely changed, however, it is possible to better prevent the optical film from being peeled, by providing the press member at the position.

The manufacturing system of an optical display unit according to a eleventh aspect of the present invention relates to the manufacturing system of an optical display unit, wherein the press member is formed into a bent shape or a curved shape corresponding to the bent portion or the curved portion opposed thereto.

According to the present invention, since the press member is formed into the bent shape or the curved shape which corresponds to the opposed bent portion or curved portion, it is possible to well press the optical film to the release film side by the press member, wherever portion in the bent portion or the curved portion the optical film is peeled from the release film.

The manufacturing system of an optical display unit according to a twelfth aspect of the present invention relates to the manufacturing system of an optical display unit, wherein a space is formed between the pressure-sensitive adhesive type sheet material fed along the feed path and the press member, and an end portion in an upstream side in the feed direction of the pressure-sensitive adhesive type sheet material of the press member is formed in such a manner that the space becomes gradually larger toward an upstream of the feed direction.

According to the present invention, the end portion in the upstream side in the feed direction of the pressure-sensitive adhesive type sheet material of the press member is formed in such a manner that the space formed with respect to the pressure-sensitive adhesive type sheet material which is fed along the feed path become gradually larger, toward the upstream side in the feed direction. Accordingly, even in the case that the optical film has been already peeled from the release film, before being fed into the space, it is possible to well guide the leading end portion of the peeled optical film into the space. Therefore, it is possible to better prevent the optical film from being peeled from the release film.

A feed mechanism of a pressure-sensitive adhesive type optical film according to a thirteenth aspect of the present invention relates to a feed mechanism of a pressure-sensitive adhesive type optical film provided for manufacturing an optical display unit in which an optical film is adhered to a display substrate with a pressure-sensitive adhesive layer interposed therebetween, and for feeding a pressure-sensitive adhesive type optical film which is formed of the optical film and the pressure-sensitive adhesive layer and has a corresponding shape to the display substrate to be adhered, comprising:

the feed mechanism for feeding the pressure-sensitive adhesive type optical film in a state of being laminated in the pressure-sensitive adhesive layer to a long release film;

a feed direction changing apparatus positioned in an opposite side to the optical film with respect to the release film, and for changing a feed direction of the pressure-sensitive adhesive type optical film; and a peeling preventing apparatus which is opposed to the feed direction changing apparatus at a distance which is equal to or more than a total thickness of the pressure-sensitive adhesive type optical film and the release film, while interposing the pressure-sensitive adhesive type optical film and the release film therebetween, at a position at which the feed direction of the pressure-sensitive adhesive type optical film is changed, and prevents the pressure-sensitive adhesive type optical film from being peeled from the release film.

According to the present invention, the feed mechanism of a pressure-sensitive adhesive type optical film has effects similar to the manufacturing system of an optical display unit according to the first aspect of the present invention.

The feed mechanism of a pressure-sensitive adhesive type optical film according to a fourteenth aspect of the present invention relates to the feed mechanism of a pressure-sensitive adhesive type optical film, wherein the feed direction changing apparatus configures a feed path length changing apparatus for changing a path length of a feed path along which the pressure-sensitive adhesive type optical film is fed.

According to the present invention, the feed mechanism of a pressure-sensitive adhesive type optical film has effects similar to the manufacturing system of an optical, display unit according to the second aspect of the present invention.

The feed mechanism of a pressure-sensitive adhesive type optical film according to a fifteenth aspect of the present invention relates to the feed mechanism of a pressure-sensitive adhesive type optical film, wherein the feed direction changing apparatus changes the feed direction of the pressure-sensitive adhesive type optical film at 90 degrees or more.

According to the present invention, the feed mechanism of a pressure-sensitive adhesive type optical film has effects similar to the manufacturing system of an optical display unit according to the third aspect of the present invention.

The feed mechanism of a pressure-sensitive adhesive type optical film according to a sixteenth aspect of the present invention relates to the feed mechanism of a pressure-sensitive adhesive type optical film, wherein the peeling preventing apparatus is formed into a shape which is along a feed locus of the pressure-sensitive adhesive type optical film.

According to the present invention, the feed mechanism of a pressure-sensitive adhesive type optical film has effects similar to the manufacturing system of an optical display unit according to the fourth aspect of the present invention.

The feed mechanism of a pressure-sensitive adhesive type optical film according to a seventeenth aspect of the present invention relates to the feed mechanism of a pressure-sensitive adhesive type optical film, wherein a space formed between the peeling preventing apparatus and the feed direction changing apparatus is formed in such a manner as to become gradually smaller toward a downstream side from an upstream side in the feed direction of the pressure-sensitive adhesive type optical film.

According to the present invention, the feed mechanism of a pressure-sensitive adhesive type optical film has effects similar to the manufacturing system of an optical display unit according to the fifth aspect of the present invention.

The feed mechanism of a pressure-sensitive adhesive type optical film according to a eighteenth aspect of the present invention relates to the feed mechanism of a pressure-sensitive adhesive type sheet material in which a release film is laminated to an optical film adhered to a display substrate with the pressure-sensitive adhesive layer interposed therebetween, comprising:

a feeder for feeding the pressure-sensitive adhesive type sheet material in which the release film is not cut, but the optical film and the pressure-sensitive adhesive layer are cut, along a feed path having a bent portion or a curved portion; and a press member provided at a position which is opposed to the bent portion or the curved portion in the feed path, and for pressing the optical film peeling from the release film to the release film side.

According to the present invention, the feed mechanism of a pressure-sensitive adhesive type optical film has effects similar to the manufacturing system of an optical display unit according to the seventh aspect of the present invention.

BEST MODE FOR CARRYING OUT THE INVENTION (First Embodiment)

Figure 1:
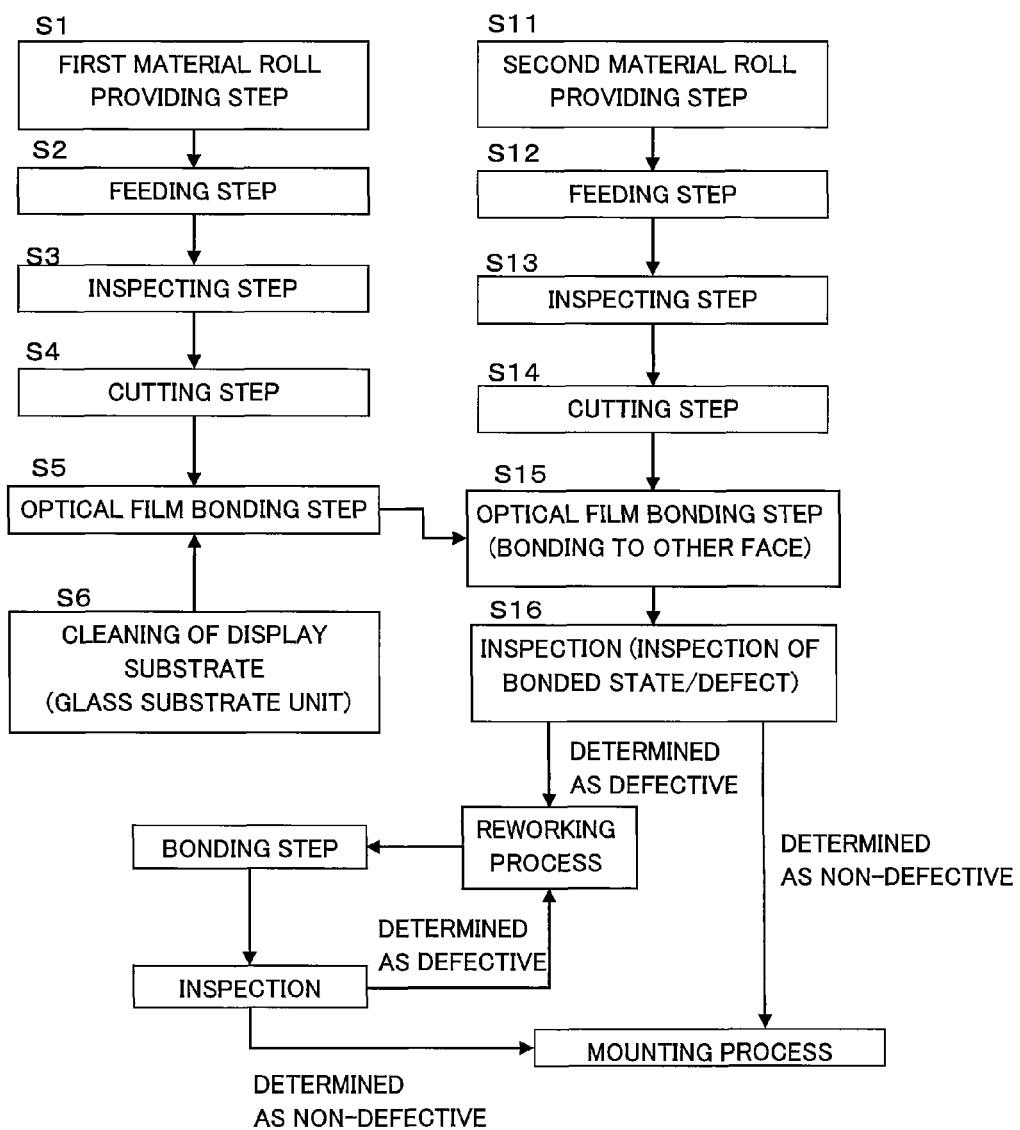
FIG. 1 is a flow chart of a method of manufacturing an optical display unit according to a first embodiment.
Figure 3:
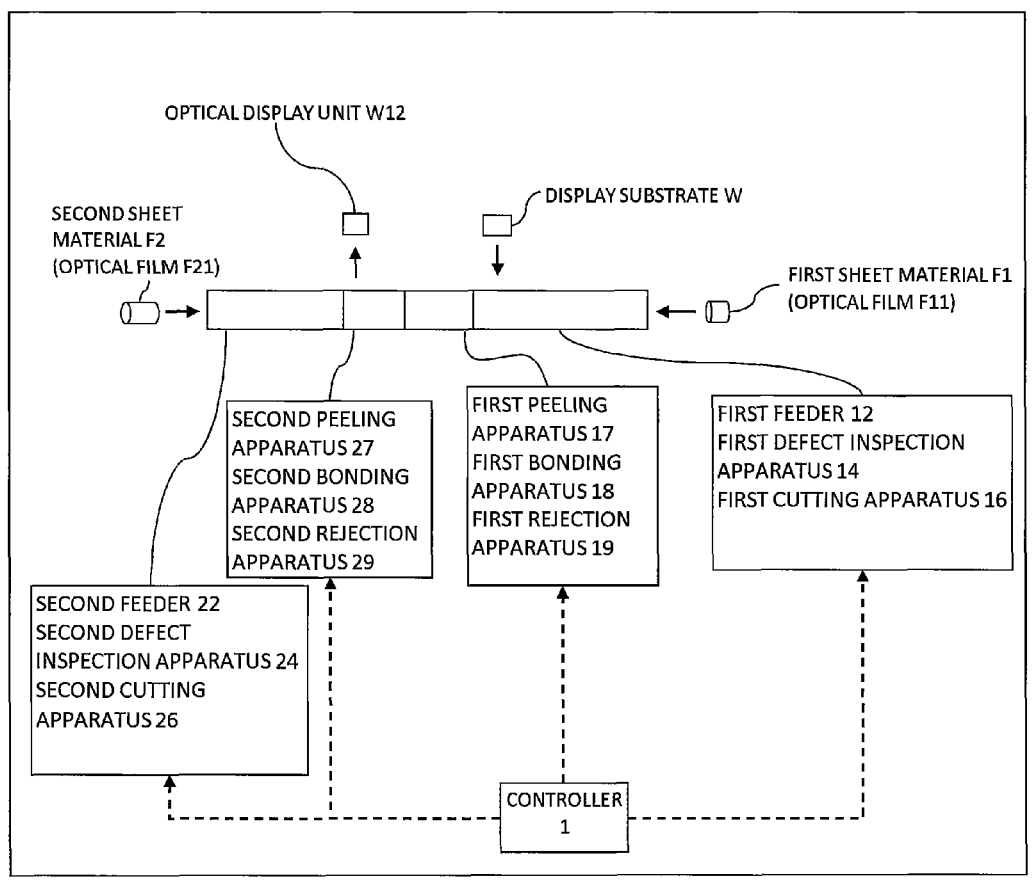
FIG. 3 is a diagram for explaining a manufacturing system according to the first embodiment.

A description will be given below of a first embodiment according to the present invention. FIG. 1 shows a flow chart of a method of manufacturing an optical display unit according to the first embodiment. FIG. 3 shows a structure of a manufacturing system for the optical display unit according to the first embodiment, and a plan arrangement diagram. The manufacturing system according to the first embodiment is a structure example which is not provided with first and second pre-inspection peeling apparatuses 13 and 23 and first and second release film laminating apparatuses 15 and 25, in a structure of a manufacturing system according to a second embodiment mentioned below. Further, as the other embodiment of the manufacturing system according to the first embodiment, a structure which is not provided with first and second defect inspection apparatuses 14 and 24 can be exemplified.

(Display Substrate)

First, for example, a glass substrate unit of a liquid crystal cell, an organic electroluminescent (EL) light-emitting unit and the like can be listed up, as a display substrate used in the present invention.

(Optical Film)

The optical film provided in the optical display unit according to the present invention is exemplified by a polarizer film, a retardation film, a visual sense compensation film, a brightness enhancement film, a combined lamination film of two or more of these films, and the like. There is a case that these optical films are structured such that a transparent film for protection (for example, a polarizer protecting film mentioned below or the like) is laminated on their surfaces. Further; a pressure-sensitive adhesive layer is formed in one surface of the optical film, in such a manner as to be bonded to the display substrate, and a release film for protecting the pressure-sensitive adhesive layer is provided thereon. Further, there is a case that a surface protecting film is provided in the other surface of the optical film with the pressure-sensitive adhesive layer interposed therebetween. A specific structure of these films will be mentioned below. In this case, the release film is peeled from the pressure-sensitive adhesive layer which is formed in the one surface of the optical film to which it is laminated, and the surface protecting film is peeled from the optical film together with the pressure-sensitive adhesive layer to which it is laminated. In the following description, the optical film on which the pressure-sensitive adhesive layer is laminated may be referred to as a pressure-sensitive adhesive type optical film, and an optical film in which a release film (or a surface protecting film and a pressure-sensitive adhesive layer laminating it to the optical film) is laminated further thereon may be referred to as a sheet material.

(Manufacturing Flow Chart)

Figure 6:
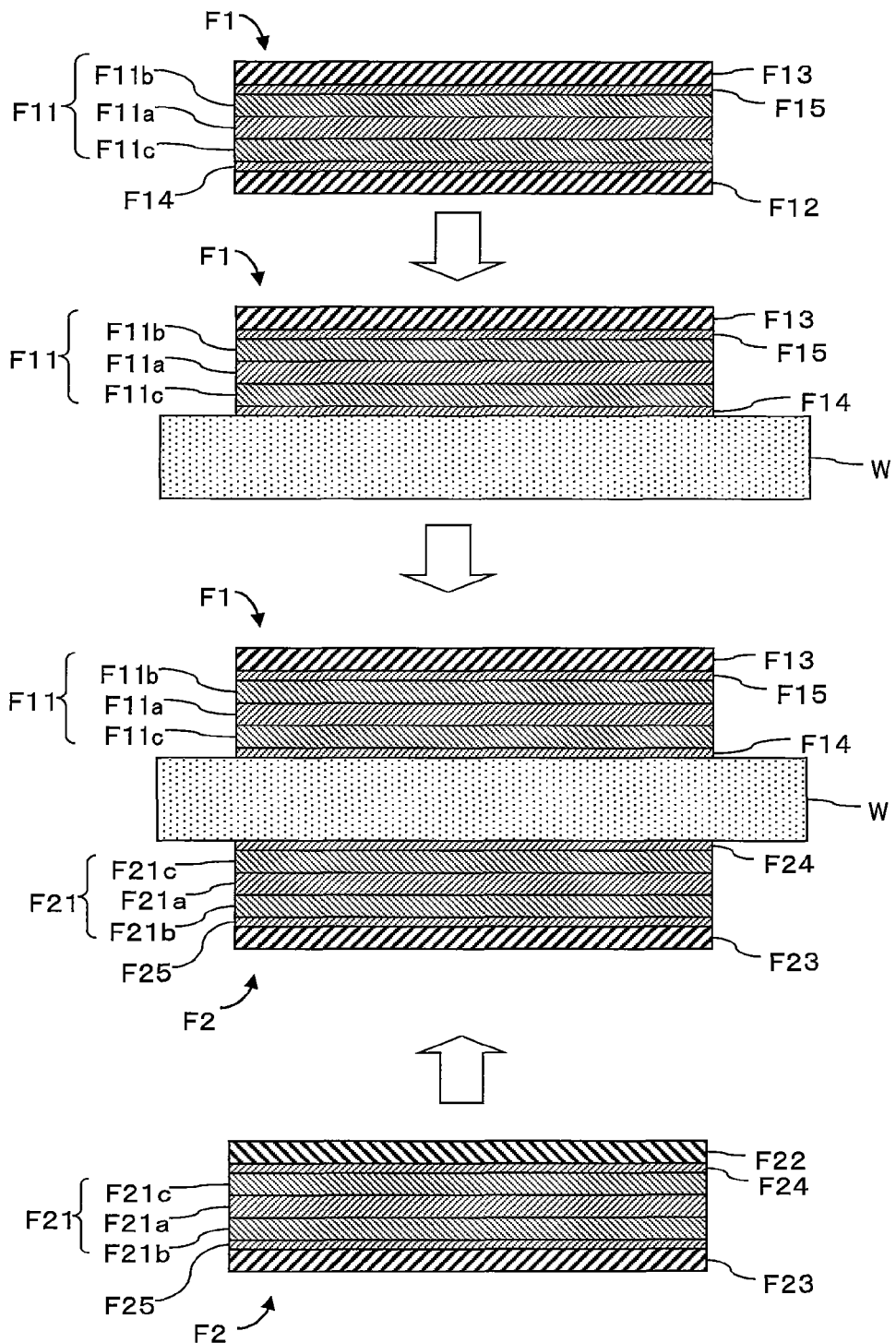
FIG. 6 is a view for explaining an example of a lamination structure of first and second optical films.

(1) First material roll providing step (FIG. 1, S1). A long first sheet material is provided as a first material roll. A width of the first material roll depends on a bonding size of the display substrate. As shown in FIG. 6, the first sheet material F1 has such a structure that a first optical film F11, and a first release film F12 are laminated with a first pressure-sensitive adhesive layer F14 interposed therebetween. In FIG. 6, there is shown a lamination structure of the first sheet material further having a first surface protecting film F13. For example, the first optical film F11 is formed of a first polarizer F11a, a first film F11b bonded to one surface of the first polarizer F11a with an adhesive layer (not shown) interposed therebetween, and a second film F11c bonded to the other surface the first polarizer F11a with an adhesive layer (not shown) interposed therebetween.

The first and second films F11b and F11c are formed, for example, of a polarizer protecting film (for example, a triacetyl cellulose film, a PET film or the like). The second film F11c is bonded to the display substrate with the first pressure-sensitive adhesive layer F14 interposed therebetween (at this time, the first release film F12 is peeled). A surface treatment can be applied to the first film F11b. As the surface treatment, for example, there can be listed up a hard coating, an anti-reflection treatment, a treatment aiming at prevention of sticking, diffusion or anti-glare, and the like. The first release film F12 is formed over the second film F11c with the first pressure-sensitive adhesive layer F14 interposed therebetween. Further, the first surface protecting film F13 is formed over the first film F11b with the pressure-sensitive adhesive layer F15 interposed therebetween. Specific structures of the first and second films F11b and F11c will be mentioned below. In the following description, a lamination structure of the polarizer and the polarizer protecting film may be referred to as a polarizing plate.

Each of the following steps is carried out within isolated equipment which is isolated from a factory, and a cleanliness is maintained. Particularly, it is preferable that the cleanliness is maintained in a bonding step of bonding the optical film to the display substrate.

(2) Feeding step (FIG. 1, S2). The first sheet material F1 is delivered from the first material roll which is provided and installed, and is fed to a downstream side of the manufacturing system of the optical display unit according to the present invention. A first feeder 12 feeding the first sheet material F1 includes, for example, a pair of nip rollers, a tension roller, a rotary drive, an accumulator A, a sensor, a controller and the like. In this case, the first feeder 12 feeds the first pressure-sensitive adhesive type optical film formed of the first optical film F11 and the first pressure-sensitive adhesive layer F14 in a state of being laminated in the first pressure-sensitive adhesive layer F14 to the long first release film F12.

(3) First inspection step (FIG. 1, S3). A defect of the first sheet material F1 is inspected by using the first defect inspection apparatus 14. As a defect inspecting method here, for example, there can be listed up a method of performing imaging of a transmitted light and/or a reflected light and image processing, with respect to both surfaces of the first sheet material F1. In the case that the first sheet material F1 includes a polarizing film, there can be listed up a method of arranging the polarizing film for inspection so as to be crossed nicols relation to a polarization axis of the first sheet material F1 (which may be referred to as 0 degree cross), performing imaging of the transmitted light transmitting through the polarizing film for inspection and the first sheet material F1 by a CCD camera, and image processing, and a method of arranging the polarizing film for inspection so as to be at a predetermined angle (for example, in a range which is larger than 0 degrees and less than 10 degrees) with respect to the polarization axis of the first sheet material F1 (which may be referred to as x degree cross), performing imaging of the transmitted light transmitting through the polarizing film for inspection and the first sheet material F1 by the CCD camera, and image processing. It is to be noted that a known method can be applied to an algorithm of the image processing, and the defect can be detected, for example, by a grayscale determination according to a binarization. Further, the method of inspecting the defect is not limited to the method of performing imaging and image processing by the CCD camera, but can employ a method which can discriminate an intensity, a wavelength change and the like of the transmitted light and the reflected light.

In the method of performing imaging of the transmitted light and image processing, the contaminant in an inner portion of the first sheet material F1 can be detected. In the method of performing imaging of the reflected light and image processing, the attached contaminant on the surface of the first sheet material F1 can be detected. In the method of performing imaging according to the 0 degree cross and image processing, the surface contaminant, the dirt, the internal contaminant and the like can be mainly detected as bright spots. In the method of performing imaging according to the x degree cross and image processing, knicks can be mainly detected.

The information of the defect obtained by the first defect inspection apparatus 14 is associated with its positional information (for example, a position coordinate), is transmitted to a controller 1, and can contribute to a cutting method by a first cutting apparatus 16 mentioned below.

(4) First cutting step (FIG. 1, 54). The first cutting apparatus 16 cuts the first surface protecting film F13, the pressure-sensitive adhesive layer F15, the first optical film F11 and the first pressure-sensitive adhesive layer F14 into a predetermined size without cutting the first release film F12. In other words, the other portions than the first release film F12 are sequentially cut into the corresponding shape to the display substrate W in the long first sheet material F1, whereby a plurality of first pressure-sensitive adhesive type optical film having the corresponding shape to the display substrate W can be obtained by such a structure that the surface thereof is protected by the first surface protecting film F13 laminated with the pressure-sensitive adhesive layer F15 interposed therebetween. As a cutting means, there can be listed up, for example, a laser, a cutter, the other known cutting means and the like. The structure is made such as to cut so as to avoid the defect based on the information of the defect obtained by the first defect inspection apparatus 14. Accordingly, a yield ratio of the first pressure-sensitive adhesive type optical film in the first sheet material F1 is significantly improved. The first pressure-sensitive adhesive type optical film in the first sheet material F1 including the defect is rejected by a first rejection apparatus 19 mentioned below, and is structured in such a manner as not to be attached to the display substrate W.

(5) First optical film bonding step (FIG. 1, S5). The first pressure-sensitive adhesive type optical film with the surface protecting film from which the first release film F12 is removed is bonded to the display substrate W by the first pressure-sensitive adhesive layer F14 by using the first bonding apparatus 18, while removing the first release film F12 by using the first peeling apparatus 17. At a time of bonding, the first pressure-sensitive adhesive type optical film with the surface protecting film and the display substrate W are pressure bonded by being pinched by the pair of rolls, as mentioned below.

(6) Cleaning step (FIG. 1, S6). The display substrate W is cleaned its front face in accordance with a polishing cleaning, a water cleaning or the like. The cleaned display substrate W is fed to the first bonding apparatus 18.

It is preferable that these steps of the first material roll providing step, the first inspection step, the first cutting step, the first optical film bonding step and the cleaning step are provided as a continuous manufacturing line. In the series of manufacturing steps mentioned above, the first pressure-sensitive adhesive type optical film with the surface protecting film is bonded to one surface of the display substrate W. A description will be given below of a manufacturing step of bonding a second pressure-sensitive adhesive type optical film formed of a second optical film F21 and a second pressure-sensitive adhesive layer F25 (or further including a second surface protecting film F23 and a pressure-sensitive adhesive layer F25 laminating it to the second optical film F21) to the other surface of the display substrate W.

(7) Second material roll providing step (FIG. 1, S11). The long second sheet material F2 is provided as a second material roll. As shown in FIG. 6, a lamination structure of the second sheet material F2 is the same structure as the first sheet material, however, is not limited thereto. The second sheet material F2 has such a structure that the second optical film F21 and the second release film F22 are laminated with the second pressure-sensitive adhesive layer F24 interposed therebetween. In FIG. 6, there is shown a lamination structure of the second sheet material further having the second surface protecting film F23. For example, the second optical film F21 is formed of a second polarizer 21a, a third film F21b provided in one surface of the second polarizer 21a with an adhesive layer (not shown) interposed therebetween, and a fourth film F21c provided in the other surface of the second polarizer 21a with an adhesive layer (not shown) interposed therebetween.

The third and fourth films F21b and F21c include, for example, a polarizer protecting film (for example, a triacetyl cellulose film, a PET film or the like). The fourth film F21c is bonded to the display substrate with the second pressure-sensitive adhesive layer F24 interposed therebetween (at this time, the second release film F22 is peeled). A surface treatment can be applied to the third film F21b. As the surface treatment, for example, there can be listed up a hard coating, an anti-reflection treatment, a treatment aiming at prevention of sticking, diffusion or anti-glare, and the like. The second release film F22 is formed over the fourth film F21c with the second pressure-sensitive adhesive layer F24 interposed therebetween. Further, the second surface protecting film F23 is formed over the third film F21b with the pressure-sensitive adhesive layer F25 interposed therebetween. Specific structures of the third and fourth films F21b and F21c will be mentioned below.

(8) Feeding step (FIG. 1, S12). The second sheet material F2 is delivered from the second material roll which is provided and installed, and is fed to a downstream side of the manufacturing system of the optical display unit according to the present invention. A second feeder 22 feeding the second sheet material includes, for example, a pair of nip rollers, a tension roller, a rotary drive, an accumulator A, a sensor, a controller and the like. In this case, the second feeder 22 feeds the second pressure-sensitive adhesive type optical film formed of the second optical film F21 and the second pressure-sensitive adhesive layer F24 in a state of laminating in the second pressure-sensitive adhesive layer F24 to the long second release film F22.

(9) Second inspecting step (FIG. 1, S13). A defect of the second sheet material F2 is inspected by using a second defect inspection apparatus 24. The defect inspecting method in this case is the same as the method by the first defect inspection apparatus mentioned above.

(10) Second cutting step (FIG. 1, S14). A second cutting apparatus 26 cuts the second surface protecting film F23, the pressure-sensitive adhesive layer F25, the second optical film F21 and the second pressure-sensitive adhesive layer F24 into a predetermined size without cutting the second release film F22. In other words, in the long second sheet material F2, the other portions than the second release film F22 are sequentially cut into the corresponding shape to the display substrate W, whereby a plurality of second pressure-sensitive adhesive type optical film having the shape corresponding to the display substrate W are obtained as a structure which is protected its surface by the second surface protecting film F23 laminated with the pressure-sensitive adhesive layer F25 interposed therebetween. As a cutting means, there can be listed up, for example, a laser apparatus, a cutter, the other known cutting means and the like. The structure is made such as to cut so as to avoid the defect based on the information of the defect obtained by the second defect inspection apparatus 24. Accordingly, a yield ratio of the second pressure-sensitive adhesive type optical film in the second sheet material F2 is significantly improved. The second pressure-sensitive adhesive type optical film in the second sheet material F2 including the defect is rejected by a second rejection apparatus 29 mentioned below, and is structured in such a manner as not to be attached to the display substrate W.

(11) Second optical film bonding step (FIG. 1, S15). Next, after the second cutting step, the second pressure-sensitive adhesive type optical film with the surface protecting film from which the second release film F22 is removed is bonded to a different surface from the surface to which the first optical film F11 of the display substrate W is bonded by the second pressure-sensitive adhesive layer F24, by using the second bonding apparatus 28, while removing the second release film F22 by using the second peeling apparatus 27. In this case, there is a case that the first optical film F11 and the second optical film F21 are set to a crossed nicols relation by turning the display substrate W at 90 degrees by a feed direction switching mechanism of the feed mechanism, before bonding the second optical film F21 to the display substrate W. At a time of bonding, the second pressure-sensitive adhesive type optical film with the surface protecting film and the display substrate W are pressure bonded by being pinched by the rolls, as mentioned below.

(12) Inspection step of optical display unit (FIG. 1, S16). The inspection apparatus inspects an optical display unit W12 in which the pressure-sensitive adhesive type optical film (or further including the surface protecting film and the pressure-sensitive adhesive layer laminating it to the optical film) is bonded to both surfaces of the display substrate W. As an inspection method, there is exemplified a method of performing imaging of the transmitted light and/or the reflected light and image processing, with respect to both surfaces of the optical display unit W12. Further, in the same manner as the first and second inspection steps, there is exemplified a method using the polarizing film for inspection. It is to be noted that a known method can be applied to an algorithm of the image processing, and the defect can be detected, for example, by a grayscale determination based on a binarization.

(13) A non-defective determination of the optical display unit W12 is carried out based on the information of the defect obtained by the inspection apparatus: The optical display unit W12 determined as the non-defective is fed to the next mounting process. In the case of being determined as the defective, a reworking process is applied, the first pressure-sensitive adhesive type optical film is newly bonded to the recovered display substrate W, and is inspected next, the step proceeds to the mounting process in the case of the non-defective determination, and the step proceeds to the reworking process again or a disinstallation is carried out in the case of the defective determination.

The optical display unit can be preferably manufactured by setting the bonding of the first pressure-sensitive adhesive type optical film with the surface protecting film, and the bonding of the second pressure-sensitive adhesive type optical film with the surface protecting film, to the continuous manufacturing line, in the series of manufacturing steps mentioned above.

(Skip Cut Method)

Further, a description will be given below of the other embodiment of the first cutting step and the second cutting step. This embodiment is particularly effectively in the case that the first inspection step and the second inspection step are not provided. There is a case that the defect information (the defect coordinate, the kind of the defect, the size thereof, and the like) of the first and second sheet materials are attached as the code information (for example, a QR code, a bar code and the like) to one end portions in the width direction of the first and second material rolls at a predetermined pitch unit (for example, 1000 mm). In other words, it is a case that the defect inspection of the pressure-sensitive adhesive type optical film is carried out in the manufacturing step of the sheet material, and the obtained defect information is attached as the code information to the sheet material. In the case mentioned above, the code information is read in a previous stage of the cutting stage, and it is cut into a predetermined size (which may be referred to as a skip cut) in the first and second cutting steps, in such a manner as to avoid the defect portion by analyzing. Further, the portion including the defect is structured such as to be removed or be bonded to the member which is not the display substrate, and a piece of sheet material which is cut into the predetermined size and is determined as the non-defective is structured such as to be bonded to the display substrate. Accordingly, a yield ratio of the optical display unit is significantly improved.

Further, as the other embodiment, there can be listed up such an embodiment as to use the sheet material structured such that the pressure-sensitive adhesive type optical film which is originally formed into the shape corresponding to the display substrate W is laminated in the pressure-sensitive adhesive layer to the long release film, as the first material roll and the second material roll. In this case, the first and second cutting steps mentioned above are not necessary. Further, if the pressure-sensitive adhesive type optical film which is originally formed into the shape corresponding to the display substrate W does not include the defect, the first and second inspection steps can be omitted.

(Second Embodiment)

Figure 2:
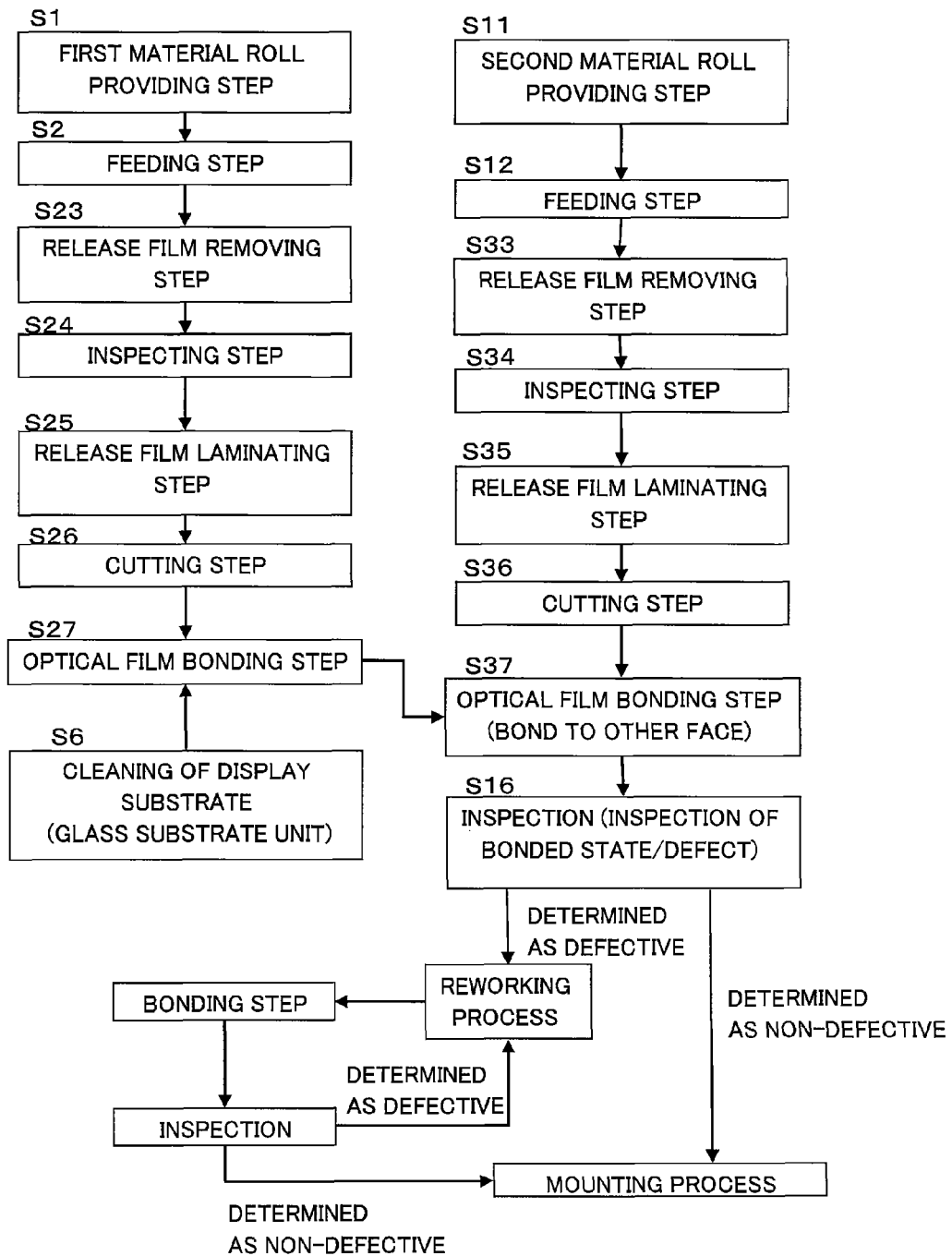
FIG. 2 is a flow chart of a method of manufacturing an optical display unit according to a second embodiment.
Figure 4:
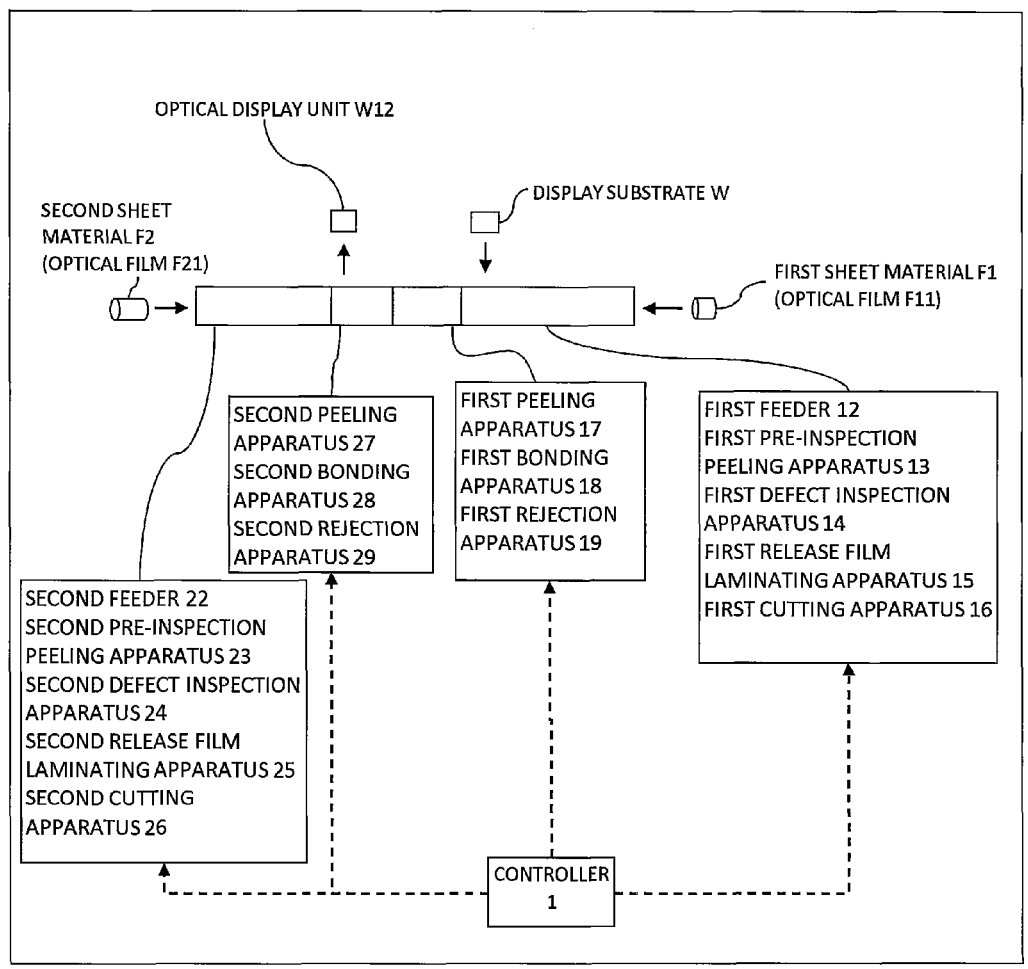
FIG. 4 is a diagram for explaining a manufacturing system according to the second embodiment.

A description will be given below of a second embodiment according to the present invention. FIG. 2 shows a flow chart of a manufacturing method of an optical display unit according to the second embodiment. FIG. 4 shows a structure of a manufacturing system of the optical display unit in the second embodiment and a plan arrangement diagram. The same processes as those of the first embodiment will be explained briefly.

(1) First material roll providing step (FIG. 2, S1). A long first sheet material F1 is provided as a first material roll. A lamination structure of a first sheet material F1 is the same as that of the first embodiment shown in FIG. 6.

(2) Feeding step (FIG. 2, S2). The first sheet material F1 is delivered from the first material roll which is provided and installed, and is fed to a downstream side of the manufacturing system of the optical display unit according to the present invention.

(3) Release film removing step (FIG. 2, S23). A first pre-inspection peeling apparatus 13 peels off the first release film F12 from the fed first sheet material F1. Details of the peeling mechanism will be mentioned below.

(4) First inspection step (FIG. 2, S24). The first defect inspection apparatus 14 inspects the defect after removing the first release film F12 from the first sheet material F1. It is possible to carry out the defect inspection of the first pressure-sensitive adhesive type optical film formed of the first optical film F11 and the first pressure-sensitive adhesive layer F14, without taking into consideration a retardation or the like internally existing in the first release film F12. The method of inspecting the defect is as mentioned above. The first pressure-sensitive adhesive type optical film including the defect is rejected together with the first release film F12 by a first rejection apparatus 19 mentioned below, and is structured such as not to be bonded to the display substrate W.

(5) Release film laminating step (FIG. 2, S25). A first release film laminating apparatus 15 laminates the first release film F12 to the first optical film F11 via the first pressure-sensitive adhesive layer F14 after the first inspecting step. It is preferable for maintaining a distortion of track to carry out the lamination in such a manner as to prevent a foam entrapment such as an air bubble at a time of laminating. Details of the first release film laminating apparatus 15 will be mentioned below.

(6) First cutting step (FIG. 2, S26). Next, a first cutting apparatus 16 cuts the first surface protecting film F13, the pressure-sensitive adhesive layer F15, the first optical film F11 and the first pressure-sensitive adhesive layer F14 into a predetermine size without cutting the first release film F12 after the release film laminating step. As the cutting portion, for example, there can be listed up a laser, a cutter, the other known cutting portion and the like.

(7) First optical film bonding step (FIG. 2, S27). Next, the first peeling apparatus 17 peels the first release film F12 after the first cutting step. The first bonding apparatus 18 bonds the first pressure-sensitive adhesive type optical film with the surface protecting film from which the first release film F12 is peeled, to the display substrate W by the first pressure-sensitive adhesive layer F14. At a time of bonding, the first bonding apparatus 18 pressure bonds the first pressure-sensitive adhesive type optical film and the display substrate W by pinching by the rolls, as mentioned below.

(8) Cleaning step (FIG. 2, S6). This is the same step as mentioned above.

(9) Second material roll providing step (FIG. 2, S11). The long second sheet material F2 is provided as a second material roll. A laminated structure of the second sheet material F2 is a structure shown in FIG. 6.

(10) Feeding step (FIG. 2, S12). The second sheet material F2 is delivered from the second material roll which is provided and installed, and is fed to a downstream side of the manufacturing system of the optical display unit according to the present invention.

(11) Release film removing step (FIG. 2, S33). A second pre-inspection peeling apparatus 23 peels off the second release film F22 from the fed second sheet material F2. Details of the peeling mechanism will be mentioned below.

(12) Second inspection step (FIG. 2, S34). The second defect inspection 24 inspects the defect after removing the second release film F22 from the second sheet material F2. It is possible to carry out the defect inspection of the second pressure-sensitive adhesive type optical film formed of the second optical film F21 and the second pressure-sensitive adhesive layer F24, without taking into consideration the retardation or the like internally existing in the second release film F22. The method of inspecting the defect is as mentioned above. The second pressure-sensitive adhesive type optical film including the defect is rejected together with the second release film F22 by a second rejection apparatus 29 mentioned below, and is structured such as not to be bonded to the display substrate.

(13) Release film laminating step (FIG. 2, S35). A second release film laminating apparatus 25 laminates the second release film F22 (shown in FIG. 7) to the second optical film F21 via the second pressure-sensitive adhesive layer F24 after the second inspecting step. It is preferable for maintaining a distortion of track to carry out the lamination in such a manner as to prevent a foam entrapment such as an air bubble at a time of laminating. Details of the second release film laminating apparatus 25 will be mentioned below.

(14) Second cutting step (FIG. 2, S36). Next, a second cutting apparatus 26 cuts the second surface protecting film F23, the pressure-sensitive adhesive layer F25, the second optical film F21 and the second pressure-sensitive adhesive layer F24 into a predetermine size without cutting the second release film F22 after the release film laminating step. As the cutting portion, for example, there can be listed up a laser, a cutter, the other known cutting portion and the like.

(15) Second optical film bonding step (FIG. 2, S37). Next, the second peeling apparatus 27 peels the second release film F22 after the second cutting step. The second bonding apparatus 28 bonds the second pressure-sensitive adhesive type optical film with the surface protecting film from which the second release film F22 is peeled, to the surface of the display substrate W which is different from the surface to which the first optical film F11 is bonded by the second pressure-sensitive adhesive layer F24. It is to be noted that there is a case that the first optical film F11 and the second optical film F21 are set to a crossed nicols relation by turning the display substrate W at 90 degrees, before bonding the second optical film F21 to the display substrate W. At a time of bonding, the second pressure-sensitive adhesive type optical film and the display substrate W are pressure bonded by being pinched by the rolls, as mentioned below. According to the above, the first optical film F11 is bonded to one surface of the display substrate W, and the second optical film F21 is bonded to the other surface, whereby it is possible to manufacture the optical display unit W12 which is provided with the optical films on both the surfaces.

(16) Inspection step of optical display unit (FIG. 2, S16). This step is the same as mentioned above.

(17) A non-defective determination of the optical display unit W12 is carried out based on the information of the defect obtained by the inspection apparatus. The optical display unit W12 determined as the non-defective is fed to the next mounting process. In the case of being determined as the defective, a reworking process is applied, the first pressure-sensitive adhesive type optical film is newly bonded to the recovered display substrate W, and is inspected next, the step proceeds to the mounting process in the case of the non-defective determination, and the step proceeds to the reworking process again or a disinstallation is carried out in the case of the defective determination.

The optical display unit can be preferably manufactured by setting the bonding of the first pressure-sensitive adhesive type optical film with the surface protecting film, and the bonding of the second pressure-sensitive adhesive type optical film with the surface protecting film, to the continuous manufacturing line, in the series of manufacturing steps mentioned above.

(Preferable Production System Achieving Production Methods of First and second Embodiments)

A description will be given below of an example of a preferable production system which achieves the production method in accordance with the second embodiment.

Various apparatuses achieving the production method in accordance with the second embodiment are isolated from an external portion by the isolating construction. An internal portion surrounded by the isolating construction is kept clean in comparison with the external portion. The isolating construction is configured by a transparent material wall and a frame construction. A blower apparatus is installed in a ceiling of the isolating construction. The blower apparatus is provided with a HEPA filter, and sends air having a high cleanliness factor to the internal portion of the partition wall construction. A lower portion of a wall surface of the partition wall construction is provided with an air discharge opening portion for discharging the internal air to the external portion. Further, a filter may be provided in an opening surface for preventing an intruding material from the external portion. It is possible to maintain a whole of the production system in a clean environment by the partition wall construction and the blower apparatus, and it is possible to preferably prevent the contaminant from being mixed from the external portion. Further, since only the production system is isolated from the external portion by the partition wall construction, it is not necessary to set a whole of factory to a so-called clean room.

First, a description will be given of a polishing cleaning apparatus. The display substrate W is taken out from the storage box, and is mounted to the feeding mechanism. If the display substrate W reaches a cleaning position, the feed is stopped, and an end portion of the display substrate W is held by a holding portion. A grinding portion is brought into contact with a top face of the display substrate W from the vertical above, and a grinding portion is brought into contact with a lower face of the display substrate from the vertical below. The grinding portions are rotated on both the surfaces of the display substrate W. Accordingly, the attached contaminants on both the surfaces of the optical display unit W are removed. As the attached contaminant, for example, a micro piece of a glass, a fiber piece and the like are exemplified.

Next, a description will be given of a water cleaning apparatus. The grind cleaned display substrate W is fed to a water bath by the feeding mechanism, and is water cleaned here. A pure water flows in an inner portion of the water bath. Both faces of the display substrate W fed from the water bath are cleaned by the pure water flown out of a flowing water pipe. Next, the display substrate W is drained by a ventilation of the clean air by means of a drying apparatus. Next, the display substrate W is fed to the first bonding apparatus. In this case, as the other embodiment, it is possible to clean by using an ethanol water solution in place of the pure water. Further, as the other embodiment, it is possible to omit the water bath.

Figure 5:
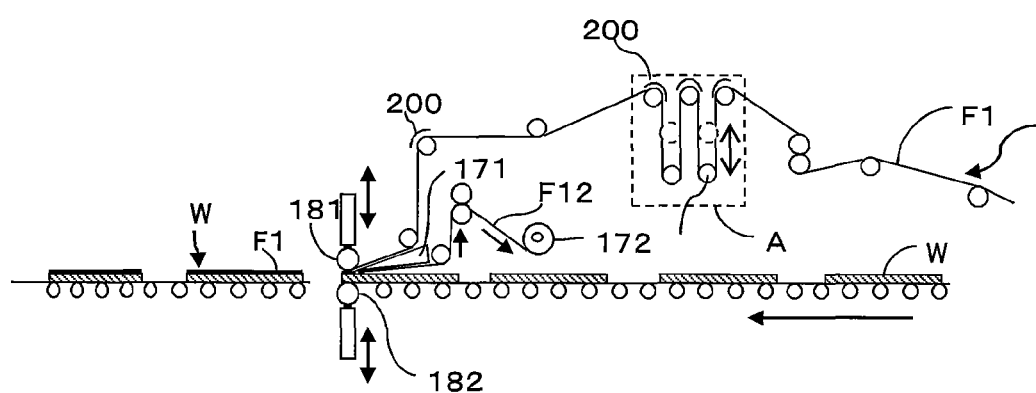
FIG. 5 is a view showing a specific structure in the vicinity of a first bonding apparatus.

Next, a description will be given in sequence of various apparatuses with reference to FIGS. 3 to 5. FIG. 5 is a view showing a specific structure in the vicinity of the first bonding apparatus 18. Only the structure in the vicinity of the first bonding apparatus 18 is shown in FIG. 5, however, the vicinity of the second bonding apparatus 28 is structured in the same manner. The first material roll of the long first sheet material F1 is installed in a roll mount apparatus which works with a motor or the like in such a manner as to freely rotate or rotate at a fixed rotating speed. The rotating speed is set by the controller 1, and is drive controlled.

The first feeder 12 is a feeding mechanism feeding the first sheet material F1 to a downward side. The first feeder 12 is provided with a lot of feed rollers, and the first sheet material F1 is fed along a feed path 12A formed by the feed rollers. The feed path 12A extends from the first material roll to the first bonding apparatus 18. The first feeder 12 is controlled by the controller 1.

The first pre-inspection peeling apparatus 13 is structured such as to peel off the first release film F12 from the first sheet material F1 fed along the feed path 12A, and wind around the roll. The winding speed around the roll is controlled by the controller 1. The peeling mechanism is structured such as to have a knife edge portion having a sharp leading end, peel off the first release film F12 by winding the first release film F12 around the knife edge portion so as to reverse transfer, and feed the first sheet material F1 after peeling off the first release film F12 in the feeding direction.

The first defect inspection apparatus 14 inspects the defect after peeling off the first release film F12. The first defect inspection apparatus 14 analyzes an image data photographed by a CCD camera so as to detect the defect, and calculates a position coordinate thereof. The position coordinate of this defect is provided for the skip cut by the first cutting apparatus 16 mentioned below.

The first release film laminating apparatus 15 laminates the first release film F12 to the first pressure-sensitive adhesive layer F14 of the film after the first defect inspection. The first release film F12 is delivered from the material roll of the first release film F12, the first release film F12 is pinched together with the first surface protecting film F13, the pressure-sensitive adhesive layer F15, the first optical film F11 and the first pressure-sensitive adhesive layer F14 by one or plural pairs of rollers, and is laminated by applying a predetermined pressure by the pair of rollers. A rotating speed of the pair of rollers, the pressure thereof, and the feeding thereof are controlled by the controller 1.

The first cutting apparatus 16 cuts the first optical film F11, the first surface protecting film F13, the first pressure-sensitive adhesive layer F14 and the pressure-sensitive adhesive layer F15 into a predetermined size without cutting the first release film F12, after laminating the first release film F12. The first cutting apparatus 16 includes, for example, a laser. The first cutting apparatus 16 cuts into the predetermined size in such a manner as to avoid the defect portion, based on the position coordinate of the defect which is detected by the first defect inspection process. In other words, the cut material including the defect portion is rejected as the defect by the first rejection apparatus 19 in the later step. Alternatively, the first cutting apparatus 16 may continuously cut into the predetermined size while disregarding the existence of the defect. In this case, the structure may be made such that the portion is removed without being bonded, in the bonding process mentioned below. The control in this case is based on the function of the controller 1.

Further, the first cutting apparatus 16 arranges a holding table adsorbing and holding the first sheet material F1 from a rear face, and is provided with the laser above the first sheet material F1. It horizontally moves in such a manner as to scan the laser in a width direction of the first sheet material F1, and cuts the first optical film F11, the first pressure-sensitive adhesive layer F14, the surface protecting film F13 and the pressure-sensitive adhesive layer F15 at a predetermined pitch in a feeding direction thereof while leaving the first release film F12 in the lowest portion (hereinafter, refer optionally to as "half cut"). Further, it is preferable that the laser is integrally configured by an air nozzle spraying a warm air toward the cut position, and a smoke collecting duct collecting a gas (a smoke) generated from the cut position fed by the warm air, in a state in which they oppose to each other, in such a manner as to sandwich from the width direction of the first sheet material F1. In the case of adsorbing the first sheet material F1 by the holding table, an accumulator of the feeding mechanism is structured such as to move up and down in a vertical direction, so as not to stop the continuous feed of the first sheet material F1 in a downstream side and an upstream side. This motion is based on the control of the controller 1.

The first bonding apparatus 18 bonds the first pressure-sensitive adhesive type optical film with the surface protecting film from which the first release film F12 is peeled, to the display substrate W by the first pressure-sensitive adhesive layer F14, after the cutting process by the first cutting apparatus 16 mentioned above. The feed path 12A of the first sheet material F1 is above the feed path of the display substrate W. A flow of a clean air from a ventilation apparatus is shut off by the first sheet material F1, and a wind power becomes weak in the upper surface of the display substrate W.

As shown in FIG. 5, in the case of bonding, the film in which the first release film F12 is peeled from the first sheet material F1 is bonded to the surface of the display substrate W while pressure contacting, by a press roller 181 and a guide roller 182. The pressing pressures and the driving motions of the press roller 181 and the guide roller 182 are controlled by the controller 1.

As a peeling mechanism 171 of the first peeling apparatus 17, the structure is made such as to have a knife edge portion having a sharp leading edge, peel the first release film F12 by winding the first release film F12 around the knife edge portion so as to inversely transfer, and deliver the first pressure-sensitive adhesive type optical film with the surface protecting film after peeling the first release film F12 to the surface of the display substrate W. At this time, it is possible to improve a precision for bonding the first pressure-sensitive adhesive type optical film with the surface protecting film by carrying out a state in which a tensile force equal to or more than 150 N/m and equal to or less than 1000 N/m is applied to the first release film F12, and/or a time until bringing the first pressure-sensitive adhesive type optical film with the surface protecting film into pressure contact with the surface of the display substrate W after the first release film F12 is peeled, within three seconds. If the tensile force is smaller than 150 N/m, the deliver position of the first pressure-sensitive adhesive type optical film with the surface protecting film is not stable, and if it is larger than 1000 N/m, the first release film F12 is elongated and there is a risk that it is broken. If the time until coming into pressure contact is longer than three seconds, an end portion of the first pressure-sensitive adhesive type optical film with the surface protecting film peeled from the first release film F12 is curved and there is a risk that a bending or an air bubble is generated. The peeled first release film F12 is wound around a roll 172. A winding control of the roll 172 is controlled by the controller 1.

The bonding mechanism is configured by the press roller 181 and the guide roller, 182 arranged so as to oppose thereto.

The guide roller 182 is configured by a rubber roller which is rotationally driven by a motor, and is arranged so as to be movable up and down. Further, the press roller 181 configured by a metal roller which is rotationally driven by a motor is arranged just above the same so as to be movable up and down. The press roller 181 is structured such as to be moved up to a higher position than a top face thereof so as to form a roller interval at a time of feeding the display substrate W to the bonding position. In this case, each of the guide roller 182 and the press roller 181 may be configured by the rubber roller or the metal roller. The display substrate W is cleaned by the various cleaning apparatuses as mentioned above, and is structured such as to be fed by the feeding mechanism. The feed control of the feeding mechanism is also controlled by the controller 1.

A description will be given of the first rejection apparatus 19 rejecting the first sheet material F1 including the defect. If the first sheet material F1 including the defect is fed to the bonding position, the guide roller moves downward vertically. Next, the roller around which the pressure sensitive adhesive tape is wound moves to a fixed position of the guide roller. The first sheet material F1 including the defect is pressed to the pressure sensitive adhesive tape by moving the press roller downward vertically, the first sheet material F1 is bonded to the pressure sensitive adhesive tape, and the first sheet material F1 including the defect is wound around the roller together with the pressure sensitive adhesive tape.

The display substrate W to which the first pressure-sensitive adhesive type optical film with the surface protecting film is bonded, is fed to a downstream side, and the second pressure-sensitive adhesive type optical film with the surface protecting film is bonded thereto. In the following description, the structure of the same apparatus will be briefly described.

In the case of bonding the second optical film F21 in a relation of 90 degrees (a crossed nicols relation) with respect to the first optical film F11, the second pressure-sensitive adhesive type optical film with the surface protecting film is bonded after rotating the display substrate W at 90 degrees by the feed direction switching mechanism of the feed mechanism. In the bonding method of the second sheet material F2 described below, the structure is made such that each of the steps is processed in a state in which the second sheet material F2 is inverted (in such a manner that the second release film F22 comes to an upper surface), and the second optical film F21 is bonded from a lower side of the display substrate W.

The second material roll of the long second sheet material F2 is installed to the roll mount apparatus working with the motor or the like in such a manner as to rotate free or rotate at a fixed rotating speed. The rotating speed is set by the controller 1, and is drive-controlled.

The second feeder 22 is a feeding mechanism feeding the second sheet material F2 to a downward side. The second feeder 22 is provided with a lot of feed rollers, and the second sheet material F2 is fed along a feed path formed by these feed rollers. The feed path extends from the second material roll to the second bonding apparatus 28. The second feeder 22 is controlled by the controller 1.

The second pre-inspection peeling apparatus 23 is structured such as to peel off the second release film F22 from the second sheet material F2 fed along the feed path so as to wind around the roll. A winding speed around the roll is controlled by the controller 1. The peeling mechanism is structured such as to have a knife edge portion having a sharp leading end, peel off the second release film F22 by winding the second release film F22 around the knife edge portion so as to reverse transfer, and feed the second pressure-sensitive adhesive type optical film with the surface protecting film after peeling off the second release film F22 in the feeding direction.

The second defect inspection apparatus 24 inspects the defect after peeling off the second release film F22. The second defect inspection apparatus 24 analyzes the image data photographed by the CCD camera so as to detect the defect, and calculates a position coordinate thereof. The position coordinate of this defect is provided for the skip cut by the second cutting apparatus 26 mentioned below.

The second release film laminating apparatus 25 laminates the second release film F22 to the second pressure-sensitive adhesive layer F24 of the film after the second defect inspection. The second release film F22 is delivered from the material roll of the second release film F22, the second release film F22 is pinched together with the second surface protecting film F23, the pressure-sensitive adhesive layer F25, the second optical film F21 and the second pressure-sensitive adhesive layer F24 by one or plural pairs of rollers, and is laminated by applying a predetermined pressure by the pair of rollers. A rotating speed of the pair of rollers, the pressure thereof, and the feeding thereof are controlled by the controller 1.

The second cutting apparatus 26 cuts the second optical film F21, the second surface protecting film F23, the second pressure-sensitive adhesive layer F24 and the pressure-sensitive adhesive layer F25 into a predetermined size without cutting the second release film F22, after laminating the second release film F22. The second cutting apparatus 26 includes, for example, a laser. The second cutting apparatus 26 cuts into the predetermined size in such a manner as to avoid the defect portion, based on the position coordinate of the defect which is detected by the second defect inspection process. In other words, the cut material including the defect portion is rejected as the defect by the second rejection apparatus 29 in the later step. Alternatively, the second cutting apparatus 26 may continuously cut into the predetermined size while disregarding the existence of the defect. In this case, the structure may be made such that the portion is removed without being bonded, in the bonding process mentioned below. The control in this case is based on the function of the controller 1.

Further, the second cutting apparatus 26 arranges a holding table adsorbing and holding the second sheet material F2 from a rear face, and is provided with the laser below the second sheet material F2. It horizontally moves in such a manner as to scan the laser in a width direction of the second sheet material F2, and cuts the second optical film F21, the second pressure-sensitive adhesive layer F24, the second surface protecting film F23 and the pressure-sensitive adhesive layer F25 at a predetermined pitch in a feeding direction thereof while leaving the second release film F22 in the lowest portion. In the case of adsorbing the second sheet material F2 by the holding table, an accumulator of the feeding mechanism is structured such as to move up and down in a vertical direction, so as not to stop the continuous feed of the second sheet material F2 in a downstream side and an upstream side. This motion is based on the control of the controller 1.

The second bonding apparatus 28 bonds the second pressure-sensitive adhesive type optical film with the surface protecting film from which the second release film F22 is peeled, to the display substrate W by the second pressure-sensitive adhesive layer F24, after the cutting process by the second cutting apparatus 26. In the case of bonding, the second optical film F21 is bonded to the surface of the display substrate W while bringing into pressure contact, by the press roller and the guide roller. The pressing pressures and the drive motions of the press roller and the guide roller are controlled by the controller 1.

As a peeling mechanism of the second peeling apparatus 27, the structure is made such as to have a knife edge portion having a sharp leading edge, peel the second release film F22 by winding the second release film F22 around the knife edge portion so as to inversely transfer, and deliver the second pressure-sensitive adhesive type optical film with the surface protecting film after peeling the second release film F22 to the surface of the display substrate W. At this time, it is possible to improve a precision for bonding the second pressure-sensitive adhesive type optical film with the surface protecting film by carrying out a state in which a tensile force equal to or more than 150 N/m and equal to or less than 1000 N/m is applied to the second release film F22, and/or a time until bringing the second pressure-sensitive adhesive type optical film with the surface protecting film into pressure contact with the surface of the display substrate W after the second release film F22 is peeled, within three seconds. If the tensile force is smaller than 150 N/m, the deliver position of the second pressure-sensitive adhesive type optical film with the surface protecting film is not stable, and if it is larger than 1000 N/m, the second release film F22 is elongated and there is a risk that it is broken. If the time until coming into pressure contact is longer than three seconds, an end portion of the second pressure-sensitive adhesive type optical film with the surface protecting film peeled from the second release film F22 is curved and there is a risk that a bending or an air bubble is generated. The peeled second release film F22 is wound around a roll. A winding control of the roll is controlled by the controller 1.

The bonding mechanism is configured by the press roller and the guide roller arranged so as to oppose thereto. The guide roller is configured by a rubber roller which is rotationally driven by a motor, and is arranged so as to be movable up and down. Further, the press roller configured by a metal roller which is rotationally driven by a motor is arranged just below the same so as to be movable up and down. The press roller is structured such as to be moved down to a below position so as to form a roller interval at a time of feeding the display substrate W to the bonding position. In this case, each of the guide roller and the press roller may be configured by the rubber roller or the metal roller.

A description will be given of the second rejection apparatus 29 rejecting the second sheet material F2 including the defect. If the second sheet material F2 including the defect is fed to the bonding position, the guide roller moves upward vertically. Next, the roller around which the pressure sensitive adhesive tape is wound moves to a fixed position of the guide roller. The second sheet material F2 including the defect is pressed to the pressure sensitive adhesive tape by moving the press roller upward vertically, the second sheet material F2 is bonded to the pressure sensitive adhesive tape, and the second sheet material F2 including the defect is wound around the roller together with the pressure sensitive adhesive tape.

The optical display unit W12 to which the first and second sheet materials are bonded, is fed to the inspection apparatus. The inspection apparatus executes an inspection with respect to both the surfaces of the fed optical display unit W12. A light source irradiates vertically the upper surface of the optical display unit W12 by a half mirror, and images a reflected light image as an image data by a CCD camera. Further, the other light source irradiates the surface of the optical display unit W12 at a predetermined angle, and images the reflected light image as the image data by the CCD camera. The inspection of the opposite surface to the optical display unit W12 is executed in the same manner by using the light source and the CCD camera. The defect is image processed and analyzed from the image data, and the non-defective is determined.

An operation timing of each of the apparatuses is calculated, for example, by a method that a sensor is arranged at a predetermined position so as to detect, or is calculated in such a manner as to detect a rotating member of the feeder and the feeding mechanism by a rotary encoder or the like. The controller 1 may be achieved by a cooperating action between a software program and a hardware resource such as a CPU, a memory or the like. In this case, the program software, a processing procedure, various settings and the like are previously stored in the memory. Further, it can be configured by a dedicated circuit, a firmware or the like.

In the production system mentioned above, the structure is made such as to bond the first pressure-sensitive adhesive type optical film with the surface protecting film from the top face of the display substrate W, and bond the second pressure-sensitive adhesive type optical film with the surface protecting film from the lower face of the display substrate W. The wind force just below the blower apparatus becomes large, and the wind force becomes weaker toward a bottom of the partition wall structure. This is because the various apparatus members, the first sheet material F1, the display substrate W and the pressure-sensitive adhesive tape stands in the way of the flow of the clean air. Particularly, the flow of the clean air is weak in the back side of the first sheet material F1, and there is a case that a retention of the clean air is generated in the top face side of the display substrate W. There is thought that the weaker the flow of the clean air is, the lower the cleanliness factor is. Since the dust and the contaminant are accumulated if the cleanliness factor is low, the contaminant is attached to the top face of the display substrate W, and there is thought that this is not preferable.

(Production System in Accordance with Other Embodiment)

Accordingly, a description will be given below of a production system which can suppress the retention of the clean air, and can bond the first pressure-sensitive adhesive type optical film with the surface protecting film to the display substrate W in a state in which the cleanliness factor is maintained high.

The first sheet material F1 is fed in a state in which the first release film F12 is set to the top face. The structures and the functions of the first pre-inspection peeling apparatus 13, the first defect inspection apparatus 14, first release film laminating apparatus 15, and the first cutting apparatus 16 are the same as mentioned above, however, the arrangements thereof are different in correspondence to the position of the first release film F12.

The first peeling apparatus 17, the first bonding apparatus 18, and the first rejection apparatus 19 are also the same as mentioned above, in their structure and function, in the same manner, however, the arrangements thereof are different in correspondence to the position of the first release film F12. Accordingly, since the first sheet material F1 is fed in the lower portion than the display substrate W, it is possible to maintain the cleanliness factor in the top face side of the display substrate W high. Further, the cleanliness factor is low around the first sheet material F1, however, since the peeled first release film F12 is formed in the top face side, the problem that the contaminant is attached at a time of bonding is reduced, even if the suspended matter is attached to the first release film F12.

The second sheet material F2 is fed in a state in which the second release film F22 is set to the lower face. The second pre-inspection peeling apparatus 23, the second defect inspection apparatus 24, the second release film laminating apparatus 25, and the second cutting apparatus 26 are the same as mentioned above in the structures and the functions thereof, however, the arrangements thereof are different in accordance with the position of the second release film F22.

The second peeling apparatus 27, the second bonding apparatus 28, and the second rejection apparatus 29 are also the same as mentioned above in the structures and the functions thereof, in the same manner, however, the arrangements thereof are different in accordance with the position of the second release film F22. In this arrangement, it is possible to maintain the cleanliness factor in the top face side of the display substrate W high. Further, it is possible to maintain the cleanliness factor around the second sheet material F2 high.

(Other Embodiment of Production System)

A known defect inspecting method can be applied to the defect inspection. An automatic inspecting apparatus is a apparatus which automatically inspects a defect (which may be also called as a blemish) of the sheet material, and is structured such as to emit a light, acquire a reflected light image or a transmitted light image via an imaging portion such as a line sensor, a two-dimensional TV camera or the like, and carry out a defect detection based on the acquired image data. Further, the image data is acquired in a state in which a polarizing filter for inspection is interposed in a light path between a light source and an imaging portion. Generally, a polarization axis (for example, a polarization absorption axis) of the polarizing filter for inspection is arranged in such a manner as to come to a state (crossed nicols relation) being orthogonal to a polarization axis (for example, a polarization absorption axis) of the polarizing plate to be inspected. Based on the arrangement in the crossed nicols, a whole area black image is input from the imaging portion if the defect does not exist, however, if the defect exists, the corresponding portion does not come to black (is recognized as a bright spot). Accordingly, it is possible to detect the defect by setting an appropriate threshold value. In the bright spot detection as mentioned above, the defect such as the surface attached material, the internal contaminant is detected as the bright spot. Further, in addition to the bright spot detection, there is a method of detecting the contaminant by CCD imaging the transmitted image with respect to the subject so as to analyze the image. Further, there is a method of detecting the surface attached contaminant by CCD imaging the reflected light image with respect to the subject so as to analyze the image.

The description is given of the method (the half cut method) of cutting the other members of the sheet material without cutting the release film, in the cutting step mentioned above. In accordance with the structure mentioned above, it is possible to cut the optical film and the pressure-sensitive adhesive layer without cutting the release film laminated to the optical film via the pressure-sensitive adhesive layer, and peel off the release film from the optical film before the bonding step applied to the display substrate. In other words, since the structure can be made such that the pressure-sensitive adhesive layer corresponding to the bonding surface of the optical film is not exposed until just before the bonding, it is possible to prevent the contaminant from being mixed into the bonding surface of the optical film.

Particularly, it is possible to feed the cut optical film and pressure-sensitive adhesive layer while using the release film as the carrier, by cutting the optical film and the pressure-sensitive adhesive layer without cutting the release film. Accordingly, since the feeder of the optical film can be made as a simpler structure, it is possible to further reduce the production cost of the optical display unit.

In the embodiment mentioned above, the first sheet material F1 is fed along the feed path 12A by the first feeder 12, after the first optical film F11, the first surface protecting film F13, the first pressure-sensitive adhesive layer F14 and the pressure-sensitive adhesive layer F15 are cut, without the first release film F12 laminated to the first optical film F11 with the first pressure-sensitive adhesive layer F14 interposed therebetween being cut, by the first cutting apparatus 16. In the same manner, the second sheet material F2 is fed along the feed path 22A by the second feeder 22, after the second optical film F21, the second surface protecting film F23, the second pressure-sensitive adhesive layer F24 and the pressure-sensitive adhesive layer F25 are cut without the second release film F22 laminated to the second optical film F21 with the second pressure-sensitive adhesive layer F24 interposed therebetween being cut, by the second cutting apparatus 26.

In this case, the feed paths 12A and 22A have a plurality of curved portions. More specifically, since a plurality of feed rollers provided in each of the feed paths 12A and 22A are not arranged on one line, but are appropriately arranged in conformity to the arranged positions of the respective apparatuses, the feed paths 12A and 22A are curved along an outer peripheral surface of at least a part of the feed rollers. In the curved portion of the feed paths 12A and 22A mentioned above, the forward moving directions of the fed first sheet material F1 and second sheet material F2 are changed.

In the case of feeding the sheet materials F1 and F2 in which the release films F12 and F22 laminated to the optical films F11 and F21 with the pressure-sensitive adhesive layers F14 and F24 interposed therebetween as mentioned above are not cut, but the other portions than the release films F12 and F22, that is, the optical films F11 and F21, the surface protecting films F13 and F23, the pressure-sensitive adhesive layers F14 and F24, and the pressure-sensitive adhesive layers F15 and F25 (hereinafter, referred to as "film main body") are cut, along the feed paths 12A and 22A, the film main body tends to be peeled from the release films F12 and F22, in the curved portions of the feed paths 12A and 22A. Accordingly, in the present embodiment, one or a plurality of press members 200 are provided between the first cutting apparatus 16 and the first bonding apparatus 18 in the feed path 12A, and between the second cutting apparatus 26 and the second bonding apparatus 28 in the feed path 22A. These press members 200 are provided at opposed positions to the curved portion in the feed paths 12A and 22A, and are provided for pressing the film main body peeling from the release films F12 and F22 to the release films F12 and F22 side.

In an example in FIG. 5, one or a plurality of press members 200 are provided respectively between the cutting apparatus 16 and the accumulator A in the downstream side, within the accumulator (the displacement mechanism) A, and between the accumulator A and the bonding apparatus 18 in the downstream side, in the feed path 12A. Further, although not shown in the drawing, the structure as mentioned above is provided in the vicinity of the second bonding apparatus 28, and one or a plurality of press members 200 are provided respectively between the cutting apparatus 26 and the accumulator A in the downstream side, within the accumulator (the displacement mechanism) A, and between the accumulator A and the bonding apparatus 28 in the downstream side.

It is preferable that a position of the press member 200 provided between the cutting apparatuses 16 and 26 and the accumulator A in the downstream side is an opposite position to the feed roller which is primarily arranged in the downstream side of the cutting apparatuses 16 and 26, or the feed roller which is primarily arranged in the downstream side of the cutting apparatuses 16 and 26 in the feed rollers in which the forward moving directions of the sheet materials F1 and F2 fed along the feed paths 12A and 22A are changed at 90 degrees or more. Since in the sheet materials F1 and F2 just after being cut by the cutting apparatuses 16 and 26, the film main bodies tend to be peeled particularly from the release films F12 and F22, it is possible to well prevent the film main body from being peeled from the release films F12 and F22, based on the structure mentioned above.

It is preferable that the position of the press member 200 provided within the accumulator A is an opposite position to the feed roller which is primarily arranged in the upstream side or the downstream side of the displacement roller A1 which is provided in the accumulator A and displaces in the upward and downward vertical direction. One or a plurality of displacement rollers A1 are provided in the accumulator A, and the path lengths of the feed paths 12A and 22A are changed based on the displacement of the displacement roller A1 in the upward and downward vertical direction. In the case of adsorbing the sheet materials F1 and F2 by the retaining table in the downstream side, it is possible to prevent the continuous feeding of the sheet materials F1 and F2 in the downstream side and the upstream side from stopping. In other words, the accumulator A configures the feed path length changing apparatus for changing the path length of the feed path along which the sheet materials F1 and F2 are fed. At a position at which the path lengths of the feed paths 12A and 22A are changed, such as the accumulator A; the film main body tends to be peeled from the release films F12 and F22, however, it is possible to well prevent the film main body from being peeled, by providing the press member 200 at the position mentioned above.

It is preferable that the position of the press member 200 provided between the accumulator A and the bonding apparatuses 18 and 28 in the downstream side is an opposite position to the feed roller in which the forward moving directions of the sheet materials F1 and F2 fed along the feed paths 12A and 22A are changed at 90 degrees or more. In the bonding apparatuses 18 and 28, since the film main body is peeled from the release films F12 and F22, and the film main body is bonded to the display substrate W while applying a comparatively large tensile force to the film main body, the film main body tends to be peeled particularly from the release films F12 and F22, in the sheet materials F1 and F2 fed between the accumulator A and the bonding apparatuses 18 and 28 in the downstream side. Accordingly, it is possible to well prevent the film main body from being peeled from the release films F12 and F22, by providing the press member 200 between the accumulator A and the bonding apparatuses 18 and 28 in the downstream side.

Figure 7:
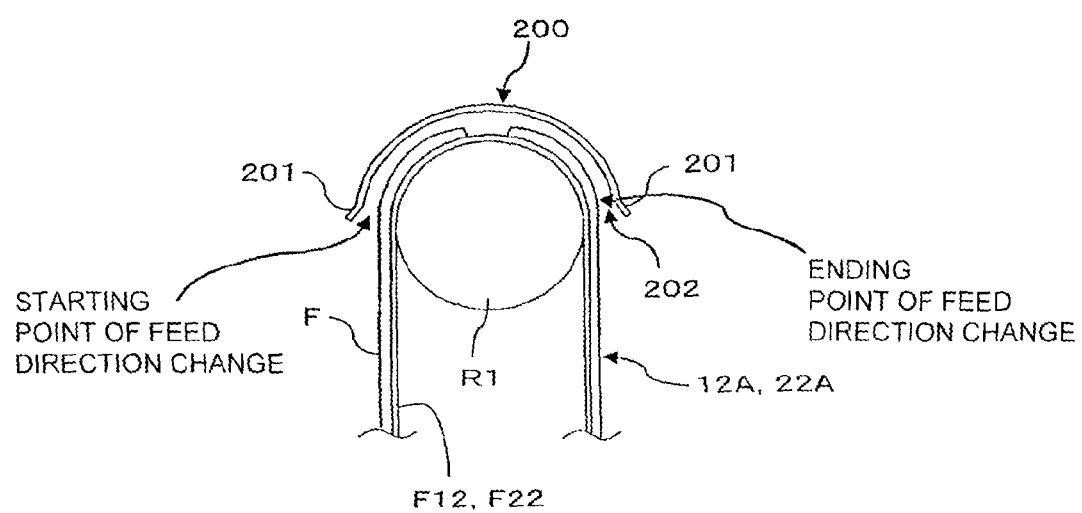
FIG. 7 is a substantial part enlarged view showing an example of a structure of a press member.

FIG. 7 is a substantial part enlarged view showing an example of a structure of the press member 200. In the example in FIG. 7, the press member 200 is provided at an opposed position to a feed roller R1 forming the curved portion of the feed path 12A of the first sheet material F1 or the feed path 22A of the second sheet material F2. In this case, the feed roller R1 is positioned in an opposite side to the film main body F with respect to the release films F12 and F22, and configures the feed direction changing apparatus changing the feed direction (the forward moving direction) of the sheet materials F1 and F2. The sheet materials F1 and F2 fed along the feed paths 12A and 22A are fed in such a manner that the release films F12 and F22 come into contact with the feed roller R1, and are structured such that the forward moving direction thereof is changed at 90 degrees or more, for example, 180 degrees, in the curved portion formed by the feed roller R1.

As mentioned above, in the curved portion having such a large angle that the forward moving directions of the sheet materials F1 and F2 are changed at 90 degrees or more, that is, at such a position that the forward moving directions of the sheet materials F1 and F2 are largely changed, the film main body F tends to be peeled from the release films F12 and F22, however, it is possible to well prevent the film main body F from being peeled, by providing the press member 200 at the position. In this case, the forward moving directions of the sheet materials F1 and F2 fed along the feed paths 12A and 22A are not limited to such a structure that is changed at 90 degrees or more in the curved portion, but may be structured such as to be changed in a range which is larger than 0 degrees and smaller than 90 degrees.

The press member 200 is formed into a curved shape (a circular arc shape) which corresponds to the curved portions of the feed paths 12A and 22A, that is, the outer peripheral surface of the feed roller R1. In other words, the press member 200 is formed into a shape which is along a feed locus of the pressure-sensitive adhesive type optical film (the first pressure-sensitive adhesive type optical film or the second pressure-sensitive adhesive type optical film) included in the sheet materials F1 and F2. More specifically, the press member 200 is opposed to the outer peripheral surface of the feed roller R1 forming the curved portion so as to be spaced at a distance which is larger than a thickness of the fed sheet materials F1 and F2. In other words, the press member 200 is an example of the peeling preventing apparatus which is opposed to the feed roller R1 (the feed direction changing apparatus) at a distance which is equal to or more than a total thickness of the pressure-sensitive adhesive type optical film and the release films F12 and F22, while interposing the sheet materials F1 and F2 therebetween, at the position at which the feed directions of the sheet materials F1 and F2 are changed, and prevents the pressure-sensitive adhesive type optical film from being peeled from the release films F12 and F22. It is preferable that the distance between the press member 200 and the outer peripheral surface of the feed roller R1 is a distance which exceeds the total thickness of the pressure-sensitive adhesive type optical film and the release films F12 and F22 (in the case of including the surface protecting film and the pressure-sensitive adhesive layer laminating it to the optical film, the total thickness including them). Accordingly, a space 202 is formed between the sheet materials F1 and F2 fed along the feed paths 12A and 22A and the press member 200, and it is possible to feed the sheet materials F1 and F2 without robbing the press member 200 by the space 202. Further, since the press member 200 is formed into the curved shape corresponding to the opposed curved portion, it is possible to well press to the release films F12 and F22 side by the press member 200, even in the case that the film main body F is peeled from the release films F12 and F22 at whichever portion in the curved portion.

Each of the end portions in the upstream side and the downstream side in the feed direction of the sheet materials F1 and F2 of the press member 200 is formed into such a bent shape that backs away from the feed roller R1 toward its leading end. Accordingly, the end portion in the upstream side in the feed direction of the press member 200 is formed in such a manner that the space 202 becomes gradually larger toward the upstream side in the feed direction (in such a manner that the space 202 becomes gradually smaller toward the downstream side from the upstream side in the feed direction), and the end portion in the downstream side in the feed direction of the press member 200 is formed in such a manner that the space 202 becomes gradually larger toward the downward side in the feed direction.

However, the structure is not limited thereto, but may be made such that only one end portion in the upstream side and the downstream side in the feed direction of the press member 200 is formed into the bent shape as mentioned above, or may be made such that both the end portions are not formed into the bent shape as mentioned above. In this case, as long as at least the upstream side end portion in the feed direction of the press member 200 is formed into the bent shape, it is possible to well guide the leading end portion of the peeled film main body F into the space 202, even in the case that the film main body F has been already peeled from the release films F12 and F22, before it is fed into the space 202. Therefore, it is possible to better prevent the film main body F from being peeled from the release films F12 and F22.

This example is formed in such a manner that the outer diameter of the feed roller R1 opposed to the press member 200 comes to 200 mm. It is preferable that the feed roller R1 is formed in such a manner that the outer diameter is larger, for example, about 1.5 times to twice than the feed roller which is not provided with the press member 200. Accordingly, since it is possible to form the curved portion formed by the feed roller R1 as a more smoothly curved shape, the film main body F is hard to be peeled from the release films F12 and F22.

Further, in view of making the film main body F hard to be peeled from the release films F12 and F22, it is possible to process the surfaces of the release films F12 and F22 in which the pressure-sensitive adhesive layers F14 and F24 are formed, so as to be harder to be peeled. In this case, at a time of bonding the sheet materials F1 and F2 to the display substrate W, it is necessary to process such a degree that the pressure-sensitive adhesive layers F14 and F24 are not attached to the release films F12 and F22 side at a time of peeling the release films F12 and F22 from the film main body F.

In the example in FIG. 7, the description is given of the case that the press member 200 is provided at the position which is opposed to the curved portions of the feed paths 12A and 22A, however, the structure is not limited thereto, but may be made such that the press member 200 is provided at the opposite position to the bent portion in the case that the bent portion is formed in the feed paths 12A and 22A. In this case, the press member 200 may be formed into a bent shape corresponding to the bent portion.

Further, in the example in FIG. 7, the description is given of the case that the press member 200 is provided at the position which is opposed to the curved portion formed by the feed roller R1 in the feed paths 12A and 22A, however, the structure is not limited thereto, but may be made such that the press member 200 is provided at a position which is opposed to the curved portions or the bent portions of the feed paths 12A and 22A formed by the other members than the feed roller R1. Further, the press member 200 is not limited to the circular arc shape as shown in FIG. 7, but may be formed into the other various shapes. Further, the press member 200 is only one example of the peeling preventing apparatus, and the present invention can be applied to a manufacturing system of an optical display unit which is provided with the other various peeling preventing apparatuses than the press member 200 mentioned above.

In this case, in the example mentioned above, the description is given of the case that the optical films F11 and F21 are peeled together with the pressure-sensitive adhesive layers F14 and F24 from the release films F12 and F22, however, the present invention can be applied to a case that the optical films F11 and F21 are peeled without peeling the pressure-sensitive adhesive layers F15 and F25 from the surface protecting films F13 and F23. In other words, in the case that the surface protecting films F13 and F23 are set to the release film in the present invention, it is possible to well prevent the optical films F11 and F21 from being peeled from the surface protecting films F13 and F23, by pressing the optical films F11 and F21 which is peeled while leaving the pressure-sensitive adhesive layers F15 and F25 from the surface protecting films F13 and F23, to the surface protecting films F13 and F23 side by the press member 200.

Figure 8:
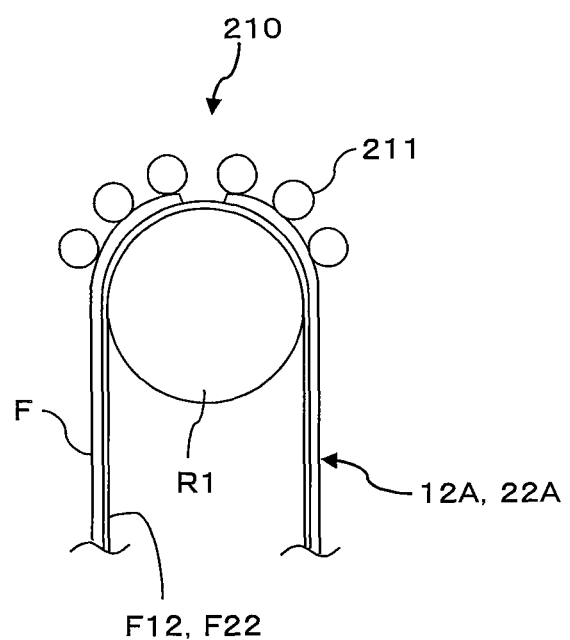
FIG. 8 is a substantial part enlarged view showing a structure of a peeling preventing apparatus according to a first modified example.

FIG. 8 is a substantial part enlarged view showing a structure of a peeling preventing apparatus 210 according to a first modified embodiment. In the example in FIG. 8, the peeling preventing apparatus 210 having a plurality of roll bars 211 serving as the press member is provided at the opposite position to the feed roller R1 forming the curved portion of the feed path 12A of the first sheet material F1 or the feed path 22A of the second sheet material F2.

A plurality of roll bars 211 are arranged in the shape of the curved portion, that is, so as to be lined up in a circular arc shape along the feed direction of the sheet materials F1 and F2, and are opposed at a distance which is equal to or more than the total thickness of the pressure-sensitive adhesive type optical film (the first pressure-sensitive adhesive type optical film or the second pressure-sensitive adhesive type optical film) and the release films F12 and F22 respectively with respect to the feed roller R1 (the feed direction changing apparatus). In other words, a plurality of roll bars 211 are arranged in the shape which is along the feed locus of the pressure-sensitive adhesive type optical film included in the sheet materials F1 and F2, and prevent the pressure-sensitive adhesive type optical film from being peeled from the release films F12 and F22. It is preferable that a distance between the roll bar 211 and the outer peripheral surface of the feed roller R1 is a distance which exceeds the total thickness of the pressure-sensitive adhesive type optical film and the release films F12 and F22 (in the case of including the surface protecting film and the pressure-sensitive adhesive layer laminating it to the optical film, the total thickness including them).

The roll bar 211 is arranged in such a manner that an axis thereof extends in an orthogonal direction with respect to the feed direction of the sheet materials F1 and F2. The roll bar 211 may be structured such as to be rotatable around its axis, or may be structured such that it does not rotate. In the case that the roll bar 211 is structured such as to be rotatable, the roll bar 211 may be structured such as to be driven by a drive means such as a motor or the like, or may be structured such as to be rotatable without being driven by the drive means. In this case, the roll bar 211 is not limited to the structure in which a plurality of roll bars are provided, but may be structured such that only one roll bar is provided.

Figure 9:
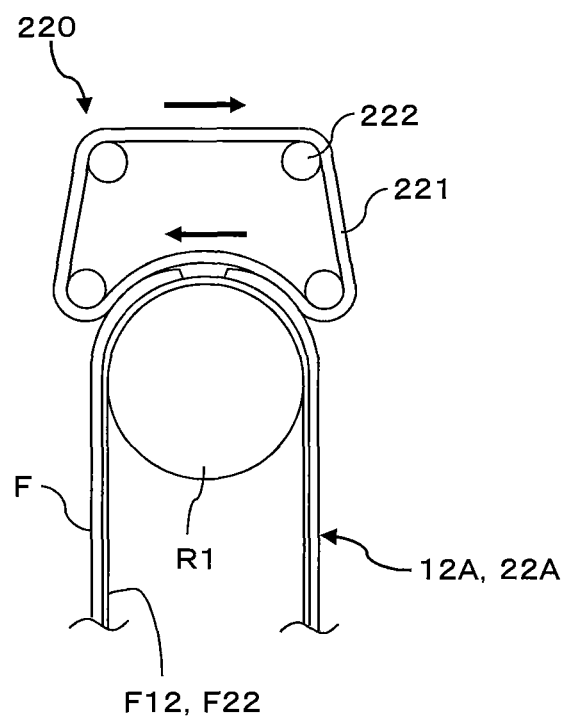
FIG. 9 is a substantial part enlarged view showing a structure of a peeling preventing apparatus according to a second modified example.

FIG. 9 is a substantial part enlarged view showing a structure of a peeling preventing apparatus 220 according to a second modified embodiment. In the embodiment in FIG. 9, a flexible annular sheet 221 serving as the press member is provided at an opposite position to the feed roller R1 forming the curved portion of the feed path 12A of the first sheet material F1 or the feed path 22A of the second sheet material F2. The annular sheet 221 is wound around a plurality of rollers 222 in which respective axes extend in the orthogonal direction to the feed direction of the sheet materials F1 and F2, and the annular sheet 221 and a plurality of rollers 222 configure the peeling preventing apparatus 220.

The region coming close to the feed roller R1 of the annular sheet 221 deforms as a circular arc shape along the shape of the curved portion, that is, the feed direction of the sheet materials F1 and F2, by coming into contact with the sheet materials F1 and F2 which is fed along the feed paths 12A and 22A. In this state, the region coming close to the feed roller R1 of the annular sheet 221 is opposed at a distance which is equal to or more than the total thickness of the pressure-sensitive adhesive type optical film (the first pressure-sensitive adhesive type optical film or the second pressure-sensitive adhesive type optical film) and the release films F12 and F22 with respect to the feed roller R1 (the feed direction changing apparatus). In other words, the region coming close to the feed roller R1 of the annular sheet 221 is formed into a shape which is along the feed locus of the pressure-sensitive adhesive type optical film included in the sheet materials F1 and F2, and prevents the pressure-sensitive adhesive type optical film from being peeled from the release films F12 and F22. It is preferable that the distance between the annular sheet 221 and the outer peripheral surface of the feed roller R1 is a distance which exceeds the total thickness of the pressure-sensitive adhesive type optical film and the release films F12 and F22 (in the case of including the surface protecting film and the pressure-sensitive adhesive layer bonding it to the optical film, the total thickness including them).

A plurality of rollers 222 are structured such as to be rotatable around respective axes. These plurality of rollers 222 may be structured such that at least one is driven by a drive means such as a motor or the like, or may be structured such that all the rollers 222 are not driven by the drive means but are rotatable.

Figure 10:
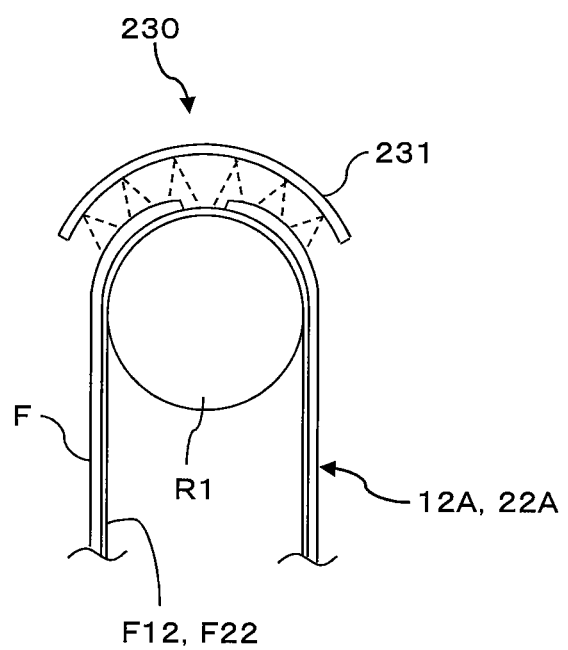
FIG. 10 is a substantial part enlarged view showing a structure of a peeling preventing apparatus according to a third modified example.
Figure 11:
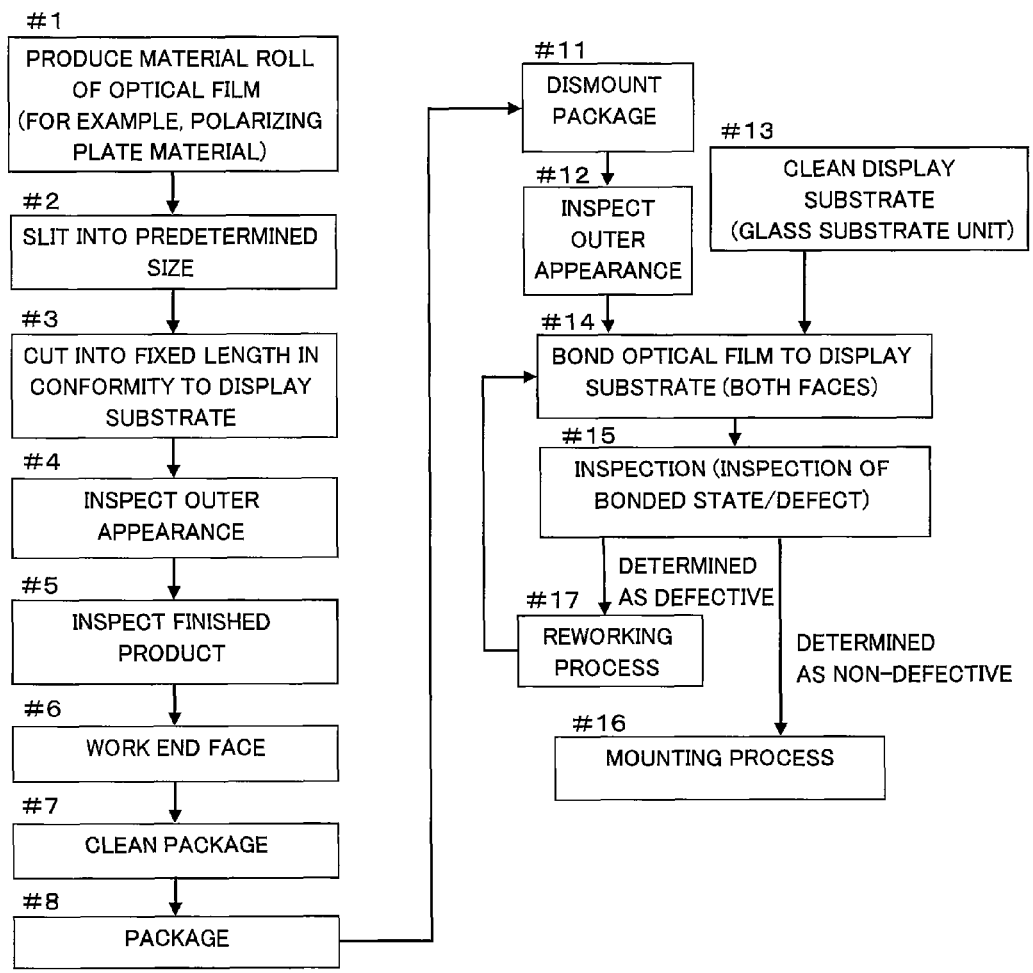
FIG. 11 is a flow chart of a method of manufacturing a conventional optical display unit.

FIG. 10 is a substantial part enlarged view showing a structure of a peeling preventing apparatus 230 according to a third modified embodiment. In the example in FIG. 10, the peeling preventing apparatus 230 having an air injection apparatus 231 serving as the press member is provided at an opposite position to the feed roller R1 forming the curved portion of the feed path 12A of the first sheet material F1 or the feed path 22A of the second sheet material F2.

The air injection apparatus 231 is formed into a shape of the curved portion, that is, a circular arc shape along the feed direction of the sheet materials F1 and F2, and is opposed at a distance which is equal to or more than the total thickness of the pressure-sensitive adhesive type optical film (the first pressure-sensitive adhesive type optical film or the second pressure-sensitive adhesive type optical film) and the release films F12 and F22 with respect to the feed roller R1 (the feed direction changing apparatus). In other words, the air injection apparatus 231 is arranged in a shape which is along the feed locus of the pressure-sensitive adhesive type optical film included in the sheet materials F1 and F2. The air injection apparatus 231 prevents the pressure-sensitive adhesive type optical film from being peeled from the release films F12 and F22, by injecting the air at a high pressure from the opposite side to the feed roller R1, with respect to the sheet materials F1 and F2 fed along the feed paths 12A and 22A. It is preferable that a distance between the air injection apparatus 231 and the outer peripheral surface of the feed roller R1 is a distance which exceeds the total thickness of the pressure-sensitive adhesive type optical film and the release films F12 and F22 (in the case of including the surface protecting film and the pressure-sensitive adhesive layer laminating it to the optical film, the total thickness including them).

In this case, the structure is not limited such as to inject the air like the air injection apparatus 231, but may be made such as to prevent the pressure-sensitive adhesive type optical film from being peeled from the release films F12 and F22, by injecting the other gases than the air.

(Example of Structure and Producing Method of Optical Film)

First, a description will be given of a polarizing plate as one example of the optical film. The polarizing plate can be obtained by laminating, for example, a tri-acetyl cellulose (TAC) film (a polarizer protecting film) to one face of a previously produced polyvinyl alcohol film (a polarizer), and laminating a polyethylene terephthalate (PET) to the other face.

The material roll of the polarizing plate is produced, for example, in accordance with the following producing steps. (A) Step of Obtaining Polarizer, as a previous step. In this step, the polarizer is obtained by drying a polyvinyl alcohol (PVA) film to which dyeing, crosslinking and stretching steps are applied. (B) Step of Producing Polarizing Plate. In this step, the polarizing plate is produced by laminating the TAC film to one face of the polarizer via an adhesive, laminating the PET film to the other face and drying. An anti-glare processing may be previously applied to the PET film coming to a viewing side of the display device. (C) Step of Laminating Release Film (Separator) and Protection Film. The separator is laminated to the TAC film surface of the polarizing plate via a strong pressure-sensitive adhesive layer, and the surface protecting film is laminated to the PET film surface via a weak pressure-sensitive adhesive layer. In this case, the strong pressure-sensitive adhesive layer is previously coated on the separator, and the weak pressure-sensitive adhesive layer is coated on the surface protecting film. The strong pressure-sensitive adhesive layer coated on the separator is transferred to the TAC film after peeling off the separator. Further, the weak pressure-sensitive adhesive layer coated on the surface protecting film keeps being formed on the surface protecting film even after peeling off the surface protecting film, and is not substantially transferred to the PET film. In the previous step mentioned above, the long sheet material is produced, is wound as a roll shape, and is provided to the later step.

In the previous steps (A, B, C), a predetermined inspection is carried out by an inspector per each step. For example, in the case of the step (A), the inspector checks out the defect (the contaminant, the dirty, the torsion and the like) by a visual observation, in step of the feeding of the PVA material. Further, in the case of the step (B), the inspector checks out the defect (the contaminant, the dirty, the knick, the torsion, the kink and the like) at timings of the winding start and the winding end by a visual observation, at a time of winding the obtained polarizing plate material in the roll shape. Further, the polarizing plate material after being laminated is automatically inspected by the inspecting apparatus (the known apparatus for determining the defect by photographing the contaminant, the dirty and the like by the camera and image processing), and the defect is conformed by the monitor.

Further, in the case of the step (C), the inspector carries out a grading (non-defective, defective, propriety of shipment) of the sheet material by checking out the defect (the contaminant, the dirty, the torsion and the like) at timings of the winding start and the winding end by the visual observation, at a time of winding the obtained long sheet material in the roll shape, and evaluating the defect.

Next, (D) Slit Step of Material roll, as a post step. Since the material roll is wide, the material roll is slit into a predetermined size in conformity to the size of the optical display unit corresponding to the final product. The slit step is omitted in some width of the material roll. Next, (E) Inspecting Step of Material roll. In this case, the visual observation inspection is carried out by a roll type automatic inspecting apparatus and/or the inspector, as an outer appearance inspection of the long sheet material. The roll type automatic inspecting apparatus is a known apparatus for determining the defect by photographing a winding fault, an outer appearance defect and the like by a camera, and image processing.

In the steps mentioned above, the produced material roll is put into a package and is shipped to the next step place. On the other hand, in the case that the bonding step to the display substrate is carried out in the same place, it is fed to the next step in a simplified package or an untouched state.

The optical display device according to the present invention can be applied to an image display device (corresponding to the optical display device) such as a liquid crystal display device, an organic EL display device, a PDP and the like.

The liquid crystal display device can be formed in accordance with the conventional way. In other words, the liquid crystal display device is generally formed by appropriately assembling component parts such as a liquid crystal cell (corresponding to the display substrate), an optical film and a lighting system as occasion demands and installing a driving circuit, however, the forming way is not particularly limited in the present invention except a point that the optical film is used, and can be based on the conventional way. With regard to the liquid crystal cell, it is possible to use an optional type, for example, TN type, STN type, π type and the like.

It is possible to form an appropriate liquid crystal display device such as a liquid crystal display device in which the optical film is arranged in one side or both sides of the liquid crystal cell, one in which a backlight or a reflector is used in the lighting system, and the like. In this case, the optical film can be placed in one side or both sides of the liquid crystal cell. In the case that the optical film is provided in both sides, they may be the same or may be different. Further, at a time of forming the liquid crystal display device, it is possible to arrange appropriate parts, for example, a diffusion plate, an anti-glare layer, a anti-reflection film, a protective plate, a prism array, a lens array sheet, a light diffusion plate, a backlight and the like at appropriate positions in one layer or two layers or more.

The liquid crystal display device can be formed as a device having an appropriate structure based on conventional transmitting type, reflecting type or transmitting and reflecting both-way type in which the optical film is arranged in one side or both sides of the liquid crystal cell. Accordingly, the liquid crystal cell forming the liquid crystal display device is optional, for example, it is possible to use an appropriate type of liquid crystal cell such as an simple matrix drive type represented by a thin film transistor type.

Further, in the case that the polarizing plate or the optical member is provided in both sides of the liquid crystal cell, they may be the same or may be different. Further, at a time of forming the liquid crystal display device, it is possible to arrange appropriate parts, for example, a prism array sheet, a lens array sheet, a light diffusion plate, a backlight and the like at appropriate positions in one layer or two layers or more.

It is to be noted that, in the embodiment mentioned above, the description is given of the structure in which the feed mechanism of the pressure-sensitive adhesive type sheet material is incorporated in a part of the manufacturing system of the optical display unit, however, the structure may be made such that the feed mechanism of the pressure-sensitive adhesive type sheet material is separated from the manufacturing system of the optical display unit. In other words, the present invention can be applied to various feed mechanisms such as to feed the pressure-sensitive adhesive type sheet material used in the optical display unit, without being limited to the manufacturing system of the optical display unit.

Description of the Symbols F1 a first sheet material
F2 a second sheet material
F11 a first optical film
F11a a first polarizer
F11b a first film
F11c a second film
F12 a second release film
F13 a second surface protecting film
F14 a second pressure-sensitive adhesive layer
F21 a second optical film
F21a a second polarizer
F21b a third film
F21c a fourth film
F22 a second release film
F23 a second surface protecting film
F24 a second pressure-sensitive adhesive layer
W a display substrate

What is claimed is:

1. A manufacturing system of an optical display unit in which an optical film is adhered to a display substrate with a pressure-sensitive adhesive layer interposed therebetween, comprising:
   a laminated sheet material including a pressure-sensitive adhesive type optical film having the pressure sensitive adhesive layer, the pressure-sensitive adhesive type optical film being laminated to a release film by the pressure-sensitive adhesive layer, the pressure sensitive adhesive type optical film being cut into a shape corresponding to a shape of the display substrate and the release film being uncut;
   a feeder for feeding the laminated sheet material;
   a peeling apparatus for peeling the pressure-sensitive adhesive type optical film cut to the shape corresponding to the shape of the display substrate from the release film; and
   an optical film bonding apparatus for bonding the pressure-sensitive adhesive type optical film peeled from the release film in the pressure-sensitive adhesive layer to the display substrate, wherein
   the feeder includes:
   a feed direction changing apparatus positioned in an opposite side to the optical film with respect to the release film, and for changing a feed direction of the pressure-sensitive adhesive type optical film; and
   a peeling preventing apparatus which is arranged opposed to the feed direction changing apparatus separated by a distance which exceeds a total thickness of the laminated pressure-sensitive adhesive type optical film and the release film such that a space is formed between the entirety of the laminated pressure-sensitive adhesive type optical film and the peeling preventing apparatus while the laminated pressure-sensitive adhesive type optical film and the release film are interposed between the feed direction changing apparatus and the peeling preventing apparatus, the peeling preventing apparatus being opposed to the feed direction changing apparatus at a position at which the feed direction of the pressure-sensitive adhesive type optical film is changed, and preventing the pressure-sensitive adhesive type optical film from being peeled from the release film while the pressure-sensitive adhesive type optical film and the release film are interposed between the feed direction changing apparatus and the peeling preventing apparatus,
   wherein the peeling preventing apparatus has a bent shape or a curved shape that corresponds to a feed locus of the pressure-sensitive adhesive type optical film.

2. The manufacturing system of an optical display unit according to claim 1, wherein the feed direction changing apparatus configures a feed path length changing apparatus for changing a path length of a feed path along which the pressure-sensitive adhesive type optical film is fed.

3. The manufacturing system of an optical display unit according to claim 1, wherein the feed direction changing apparatus changes the feed direction of the pressure-sensitive adhesive type optical film at 90 degrees or more.

4. The manufacturing system of an optical display unit according to claim 1, wherein a space formed between the peeling preventing apparatus and the feed direction changing apparatus is formed in such a manner as to become gradually smaller toward a downstream side from an upstream side in the feed direction of the pressure-sensitive adhesive type optical film.

5. A manufacturing system of an optical display unit in which an optical film is adhered to a display substrate with a pressure-sensitive adhesive layer interposed therebetween, comprising:
   a pressure-sensitive adhesive type sheet material including a release film laminated to the optical film with the with the pressure-sensitive adhesive layer interposed therebetween, wherein the release film is uncut, but the optical film and the pressure-sensitive adhesive layer are cut;
   a feeder for feeding the pressure-sensitive adhesive type sheet material along a feed path having a bent portion or a curved portion;
   a press member provided at a position opposed to the bent portion or the curved portion of the feed path and arranged separated from the bent portion or the curved portion of the feed path by a distance which exceeds a thickness of the pressure-sensitive adhesive type sheet material such that a space is formed between the entirety of the pressure-sensitive adhesive type sheet material and the bent portion or the curved portion of the feed path, and provided for pressing the optical film peeled from the release film to the release film side, the press member having a bent shape or a curved shape that corresponds to a feed locus of the pressure-sensitive adhesive type sheet material;
   a peeling apparatus for peeling the release film from the pressure-sensitive adhesive type sheet material fed along the feed path; and
   an optical film bonding apparatus for bonding the optical film from which the release film is peeled, to the display substrate with the pressure-sensitive adhesive layer interposed therebetween.

6. The manufacturing system of an optical display unit according to claim 5, further comprising a cutting apparatus for cutting the optical film and the pressure-sensitive adhesive layer of the pressure-sensitive adhesive type sheet material, without cutting the release film which is laminated to the optical film with the pressure-sensitive adhesive layer interposed therebetween, wherein
   the press member is provided between the cutting apparatus and the optical film bonding apparatus in the feed path.

7. The manufacturing system of an optical display unit according to claim 5, further comprising a displacement mechanism for changing a path length of the feed path, wherein the press member is provided in the displacement mechanism.

8. The manufacturing system of an optical display unit according to claim 5, wherein a forward moving direction of the pressure-sensitive adhesive type sheet material fed along the feed path is changed at 90 degrees or more in the bent portion or the curved portion.

9. The manufacturing system of an optical display unit according to claim 5, wherein a space is formed between the pressure-sensitive adhesive type sheet material fed along the feed path and the press member, and an end portion in an upstream side in the feed direction of the pressure-sensitive adhesive type sheet material of the press member is formed in such a manner that the space becomes gradually larger toward an upstream of the feed direction.

10. A feed mechanism of a pressure-sensitive adhesive type optical film provided for manufacturing an optical display unit in which an optical film is adhered to a display substrate with a pressure-sensitive adhesive layer interposed therebetween, and for feeding a pressure-sensitive adhesive type optical film which is formed of the optical film and the pressure-sensitive adhesive layer and has a corresponding shape to the display substrate to be adhered, comprising:
   a laminated sheet material including the pressure-sensitive adhesive type optical film having the pressure-sensitive adhesive layer, the pressure-sensitive adhesive type optical film being laminated to a release film by the pressure-sensitive adhesive layer, the pressure-sensitive adhesive type optical film being cut into a shape corresponding to a shape of the display substrate and the release film being uncut;
   the feed mechanism for feeding the laminated sheet material;
   a feed direction changing apparatus positioned in an opposite side to the optical film with respect to the release film, and for changing a feed direction of the pressure-sensitive adhesive type optical film; and
   a peeling preventing apparatus which is arranged opposed to the feed direction changing apparatus separated by a distance which exceeds a total thickness of the laminated pressure-sensitive adhesive type optical film and the release film such that a space is formed between the entirety of the laminated pressure-sensitive adhesive type optical film and the peeling preventing apparatus while the laminated pressure-sensitive adhesive type optical film and the release film are interposed between the feed direction changing apparatus and the peeling preventing apparatus, the peeling preventing apparatus being opposed to the feed direction changing apparatus at a position at which the feed direction of the pressure-sensitive adhesive type optical film is changed, and preventing the pressure-sensitive adhesive type optical film from being peeled from the release film while the pressure-sensitive adhesive type optical film and the release film are interposed between the feed direction changing apparatus and the peeling preventing apparatus,
   wherein the peeling preventing apparatus has a bent shape or a curved shape that corresponds to a feed locus of the pressure-sensitive adhesive type optical film.

11. The feed mechanism of a pressure-sensitive adhesive type optical film according to claim 10, wherein the feed direction changing apparatus configures a feed path length changing apparatus for changing a path length of a feed path along which the pressure-sensitive adhesive type optical film is fed.

12. The feed mechanism of a pressure-sensitive adhesive type optical film according to claim 10, wherein the feed direction changing apparatus changes the feed direction of the pressure-sensitive adhesive type optical film at 90 degrees or more.

13. The feed mechanism of a pressure-sensitive adhesive type optical film according to claim 10, wherein a space formed between the peeling preventing apparatus and the feed direction changing apparatus is formed in such a manner as to become gradually smaller toward a downstream side from an upstream side in the feed direction of the pressure-sensitive adhesive type optical film.

14. A feed mechanism of a pressure-sensitive adhesive type sheet material in which a release film is laminated to an optical film adhered to a display substrate with a pressure-sensitive adhesive layer interposed therebetween, comprising:
   the pressure-sensitive adhesive type sheet material including the release film laminated to the optical film with the pressure-sensitive adhesive layer interposed therebetween, wherein the release film is not cut but the optical film and the pressure sensitive adhesive layer are cut;
   a feeder for feeding the pressure-sensitive adhesive type sheet material along a feed path having a bent portion or a curved portion; and
   a press member provided at a position which is opposed to the bent portion or the curved portion of the feed path and arranged separated from the bent portion or the curved portion of the feed path by a distance which exceeds a thickness of the pressure-sensitive adhesive type sheet material such that a space is formed between the entirety of the pressure-sensitive adhesive type sheet material and the bent portion or the curved portion of the feed path, and for pressing the optical film peeling from the release film to the release film side, the press member having a bent shape or a curved shape that corresponds to a feed locus of the pressure-sensitive adhesive type sheet material.

15. The manufacturing system of an optical display unit according to claim 1, wherein the peeling preventing apparatus is provided over an area from a starting point to an end point where the feed direction is changed.

16. The manufacturing system of an optical display unit according to claim 5, wherein the press member is provided over an area from a starting point to an end point where a feed direction is changed along the feed path having the bent portion or the curved portion.

17. The feed mechanism of a pressure-sensitive adhesive type optical film according to claim 10, wherein the peeling preventing apparatus is provided over an area from a starting point to an end point where the feed direction is changed.

18. The feed mechanism of a pressure-sensitive adhesive type sheet material according to claim 14, wherein the press member is provided over an area from a starting point to an end point where a feed direction is changed along the feed path having the bent portion or the curved portion.

* * * * *